US009779762B2

(12) United States Patent
Fujieda

(10) Patent No.: US 9,779,762 B2
(45) Date of Patent: Oct. 3, 2017

(54) OBJECT SOUND PERIOD DETECTION APPARATUS, NOISE ESTIMATING APPARATUS AND SNR ESTIMATION APPARATUS

(71) Applicant: Oki Electric Industry Co., Ltd., Tokyo (JP)

(72) Inventor: Masaru Fujieda, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 15/011,465

(22) Filed: Jan. 29, 2016

(65) Prior Publication Data

US 2016/0232916 A1 Aug. 11, 2016

(30) Foreign Application Priority Data

Feb. 9, 2015 (JP) ................................ 2015-023518

(51) Int. Cl.

| | |
|---|---|
| ***H04B 15/00*** | (2006.01) |
| ***G10L 21/00*** | (2013.01) |
| ***G10L 21/02*** | (2013.01) |
| ***G10L 15/00*** | (2013.01) |
| ***G10L 15/20*** | (2006.01) |
| ***G10L 25/78*** | (2013.01) |
| *G10L 25/87* | (2013.01) |

(52) U.S. Cl.

CPC .............. *G10L 25/78* (2013.01); *G10L 25/87* (2013.01); *G10L 2025/786* (2013.01)

(58) Field of Classification Search

CPC ..... G10L 15/20; G10L 15/00; G10L 21/0224; G10L 21/0205; G10L 25/87; G10L 25/93; G10L 25/78

USPC ...... 381/94.8, 94.1, 94.7; 704/233, 231, 226

See application file for complete search history.

(56) References Cited

U.S. PATENT DOCUMENTS

| | | | | |
|---|---|---|---|---|
| 8,938,389 B2 * | 1/2015 | Arakawa ................ | G10L 25/78 704/210 |
| 8,990,079 B1 * | 3/2015 | Newman ................ | G10L 15/22 704/214 |
| 2012/0232896 A1 * | 9/2012 | Taleb ...................... | G10L 25/78 704/233 |

OTHER PUBLICATIONS

Rainer Martin, "An efficient algorithm to estimate the instantaneous SNR of speech signals," in Proc. EUROSPEECH, pp. 1093-1096, Sep. 1993.

* cited by examiner

*Primary Examiner* — Thjuan K Addy
(74) *Attorney, Agent, or Firm* — Rabin & Berdo, P.C.

(57) ABSTRACT

An object sound period detection apparatus includes a first calculating unit, a second calculating unit, a first detecting unit, and a second detecting unit. The first calculating unit calculates a first threshold every unit time. The second calculating unit calculates a second threshold every unit time. The first detecting unit compares first feature amount based on the input signal with the first threshold and detects the object sound period in the input signal. The second detecting unit compares second feature amount based on the input signal with the second threshold, detects the object sound period in the input signal, and outputs a detecting result. The first calculating unit calculates the first threshold based on a detecting result before unit time by the second detecting unit. The second calculating unit calculates the second threshold based on a detecting result in same unit time by the first detecting unit.

13 Claims, 20 Drawing Sheets

OBJECT SOUND PERIOD DETECTION APPARATUS, NOISE ESTIMATING APPARATUS AND SNR ESTIMATION APPARATUS

CROSS REFERENCE TO RELATED APPLICATIONS

This application claims priority based on 35 USC 119 from prior Japanese Patent Application No. 2015-023518 filed on Feb. 9, 2015, the entire contents of which are incorporated herein by reference.

BACKGROUND OF THE INVENTION

1. Field of the Invention

This application relates to an object sound period detection apparatus, an object sound period detection apparatus, a noise estimating apparatus and SNR (Signal to Noise ratio) estimation apparatus.

2. Description of Related Art

A conventional object sound period detection apparatus detects an object sound period such as a speech period in an input signal based on a predetermined threshold. Specifically, if an estimated SNR of the input signal is bigger than the predetermined threshold, the conventional object sound period detection apparatus determines that the input signal is a signal of the speech period (see, for example, Non-patent literature, R. Martin, "An efficient algorithm to estimate the instantaneous SNR of speech signals," in Proc. EUROSPEECH 1993, pp 1093-1096, 1993).

However, it is desired that the precision of object sound period detection improves more.

SUMMARY OF THE INVENTION

According to an aspect of the disclosed invention, an object sound period detection apparatus includes a receiving unit, a first calculating unit, a second calculating unit, a first detecting unit, and a second detecting unit. The receiving unit receives an input signal. The first calculating unit calculates a first threshold in the input signal every unit time. The second calculating unit calculates s second threshold in the input signal every unit time. The first detecting unit compares first feature amount based on the input signal with the first threshold and detects the object sound period in the input signal. The second detecting unit compares second feature amount based on the input signal with the second threshold, detects the object sound period in the input signal, and outputs a detecting result. The first calculating unit calculates the first threshold based on a detecting result before unit time by the second detecting unit. The second calculating unit calculates the second threshold based on a detecting result in same unit time by the first detecting unit.

According to another aspect of the disclosed invention, a noise estimating apparatus includes a receiving unit, a first calculating unit, a second calculating unit, a first detecting unit, a second detecting unit, a first smoothing unit, and a second smoothing unit. The receiving unit that receives the input signal. The first calculating unit calculates a first threshold in the input signal every unit time. The second calculating unit calculates a second threshold in the input signal every unit time. The first detecting unit compares an input power in the input signal with the first threshold and detects the object sound period in the input signal. The second detecting unit compares an input power in the input signal with the second threshold and detects the object sound period in the input signal. The second detecting unit outputs a detecting result. The first smoothing unit smooths the input power based on the detecting result before unit time by the second detecting unit. The first smoothing unit outputs the input power smoothed by the first smoothing unit as a noise power or a speech power. The second smoothing unit smooths the input power based on the detecting result in same unit time by the first detecting unit. The second smoothing unit outputs the input power smoothed by the second smoothing unit as a noise power or a speech power. The first calculating unit calculates the first threshold based on the input power smoothed by the first smoothing unit. The second calculating unit calculates the second threshold based on the input power smoothed by the second smoothing unit. The first smoothing unit determines whether the first smoothing unit smooths the input power based on the detecting result before unit time by the second detecting unit. The second smoothing unit determines whether the second smoothing unit smooths the input power based on the detecting result in same unit time by the first detecting unit.

According to another aspect of the disclosed invention, a SNR estimation apparatus includes a receiving unit, a first calculating unit, a second calculating unit, a first detecting unit, a second detecting unit, a first smoothing unit, a SNR calculating unit, a second smoothing unit. The receiving unit receives the input signal. The first calculating unit calculates a first threshold in the input signal every unit time. The second calculating unit calculates s second threshold in the input signal every unit time. The first detecting unit compares first feature amount based on the input signal with the first threshold. The first detecting unit detects the object sound period in the input signal. The second detecting unit compares second feature amount based on the input signal with the second threshold. The second detecting unit detects the object sound period in the input signal. The second detecting unit outputs a detecting result. The first smoothing unit smooths an input power in the input signal based on the detecting result before unit time by the second detecting unit. The SNR calculating unit calculates a SNR estimation value based on the input power in the input signal and the input power smoothed in same unit time by the first smoothing unit. The second smoothing unit smooths the SNR estimation value based on the detecting result in same unit time by the first detecting unit. The second smoothing unit calculates a SNR smoothing value. The first calculating unit calculates the first threshold based on the input power smoothed by the first smoothing unit. The second calculating unit calculates the second threshold based on the SNR smoothing value. The first feature amount is the input power in the input signal. The second feature amount is the SNR estimation value.

According to an aspect of the disclosed invention, an object sound period detection apparatus includes a receiving circuit, a first calculating circuit, a second calculating circuit, a first detecting circuit, and a second detecting circuit. The receiving circuit receives an input signal. The first calculating circuit calculates a first threshold in the input signal every unit time. The second calculating circuit calculates a second threshold in the input signal every unit time. The first detecting circuit compares first feature amount based on the input signal with the first threshold and detects the object sound period in the input signal. The second detecting circuit compares second feature amount based on the input signal with the second threshold, detects the object sound period in the input signal, and outputs a detecting result. The first calculating circuit calculates the first threshold based on a detecting result before unit time by the second detecting circuit. The second calculating circuit calculates the second threshold based on a detecting result in same unit time by the first detecting circuit.

According to this invention, the precision of object sound period detection improves.

DETAILED DESCRIPTION OF EMBODIMENTS

Hereinafter, preferred embodiments of the invention will be described with reference to the attached drawings.

1. First Embodiment

1-1. Structure

Figure 1:
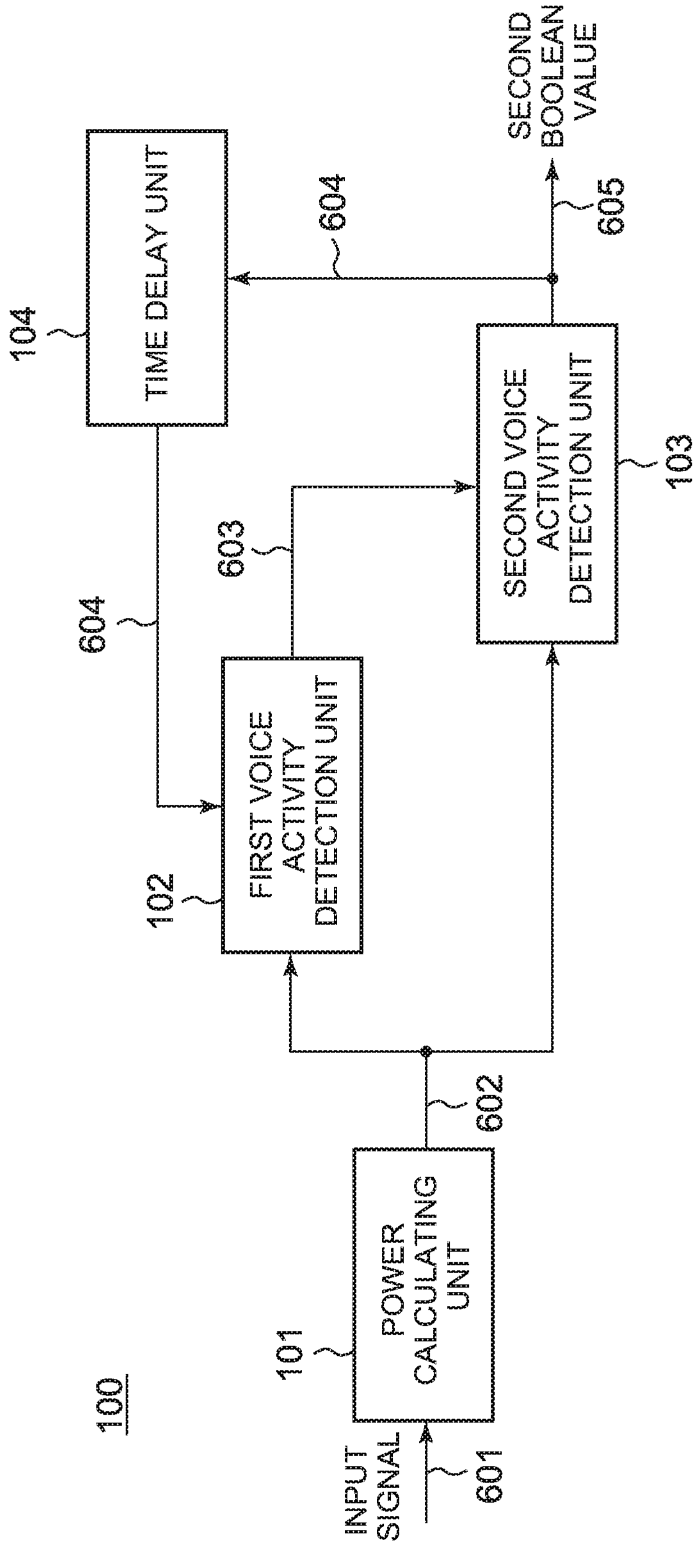
FIG. 1 is a block diagram showing a voice activity detection apparatus according to the first embodiment.

FIG. 1 is a block diagram showing a voice activity detection apparatus 100 as an object sound period detection apparatus.

As shown in FIG. 1, the voice activity detection apparatus 100 may include a power calculating unit 101, a first voice activity detection unit 102, a second voice activity detection unit 103, and a time delay unit 104. Each of these units may be hardware such as a circuit. The circuit includes an electric conductor as the wiring, and electronic parts. The circuit is able to amplify a signal. The circuit is able to calculate. The circuit is able to transfer data. Specifically, the power calculating unit 101 may be a power calculating circuit. The first voice activity detection unit 102 may be a first voice activity detection circuit. The second voice activity detection unit 103 may be a second voice activity detection circuit. The time delay unit 104 may be a time delay circuit. On the other hand, each of these units may be realized by software (voice activity detection program) and a CPU (Central Processing Unit). The detail is described later.

The power calculating unit 101 calculates input power 602 of an input signal 601, such as a digital signal, per unit time. The power calculating unit 101 outputs the input power 602 to the first voice activity detection unit 102 and the second voice activity detection unit 103. The first voice activity detection unit 102 and the second voice activity detection unit 103 may read out the input power 602 from the power calculating unit 101. The same applies hereafter. As a calculation method of the input power 602, a known calculation method may be applied. For example, the input power 602 may be a sum of square value of the input signal 601. The input power 602 may be a sum of absolute value of the input signal 601. The input power 602 may be an amplitude value of the input signal 601 in the unit time.

The first voice activity detection unit 102 detects a speech period (e.g., a voice activity) in the input signal 601 by using a second signal which includes a second parameter 604 and input power 602. Namely, the first voice activity detection unit 102 executes a process of the voice activity detection using the second parameter 604 and the input power 602. The second parameter 604 may include a second Boolean value 605 that is a detection result before the unit time by the second voice activity detection unit 103. Then the first voice activity detection unit 102 outputs a first signal which includes a first parameter 603 to the second voice activity detection unit 103. The first parameter 603 may include a first Boolean value that is a detection result in the voice activity detection by the first voice activity detection unit 102. The unit time may be a sampling cycle (for example, 8 kHz) of the input signal. The unit time may be a frame time (for example, 10 milliseconds) applied by sound processing.

The second voice activity detection unit 103 detects the speech period (the voice activity) in the input signal 601 by using the first signal which includes the first parameter 603 and the input power 602. Namely, the second voice activity detection unit 103 executes a process of the voice activity detection by using the first parameter 603 and the input power 602. Then the second voice activity detection unit 103 outputs a second signal which includes the second parameter 604 to the first voice activity detection unit 102 through the time delay unit 104. And the second voice activity detection unit 102 outputs the second signal which includes the second parameter 604 as a detection result by the voice activity detection apparatus 100. The second parameter 604 may include a second Boolean value 605 that is a detection result in the voice activity detection by the second voice activity detection unit 103.

The time delay unit 104 receives the second signal which includes the second parameter 604 from the second voice activity detection unit 103. After progress in the unit time, the time delay unit 104 outputs the second signal which includes the second parameter 604 as the second signal including the second Boolean value 605 that is a detection result before the unit time.

In the first embodiment, the first voice activity detection unit 102 outputs the first Boolean signal (the first Boolean value). The second voice activity detection unit 103 outputs the second Boolean signal (the second Boolean value 605). Namely, the first parameter 603 is the first Boolean value. The second parameter 604 is the second Boolean value 605. However, the first voice activity detection unit 102 may output the at least first Boolean signal (the at least first Boolean value). The second voice activity detection unit 103 may output the at least second Boolean signal (the at least second Boolean value 605). Namely, the first parameter 603 includes the first Boolean value. The second parameter 604 includes the second Boolean value 605.

In the first embodiment, the power calculating unit 101 outputs the input power 602 to the first voice activity detection unit 102 and the second voice activity detection unit 103. However, the power calculating unit 101 may output the input power 602 to only the first voice activity detection unit 102. Another power calculation unit (the second power calculating unit) may output the input power 602 to only the second voice activity detection unit 103. Furthermore, a calculation method of the input power 602 executing in the power calculation unit 101 may be different from a calculation method of the input power 602 executing in the second power calculating unit.

Figure 2:
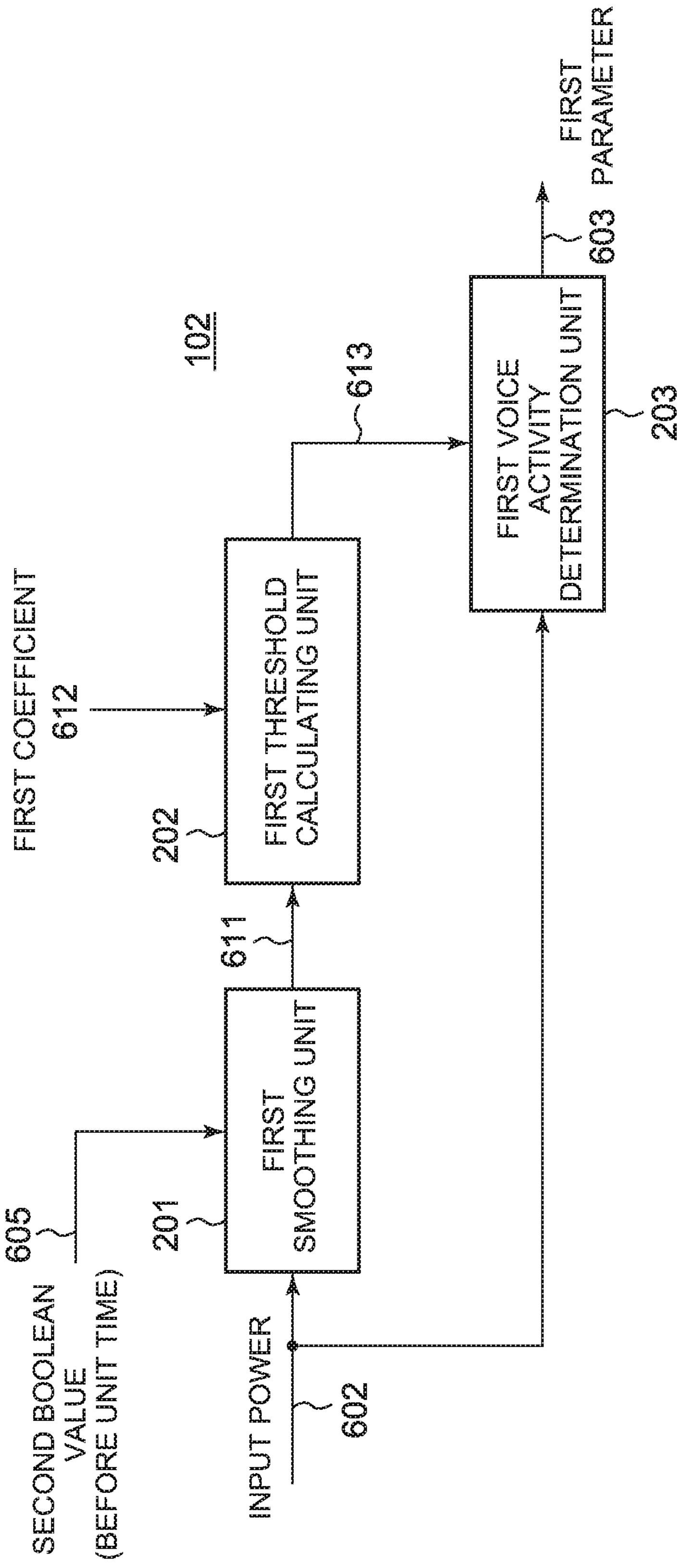
FIG. 2 is a block diagram showing a first voice activity detection unit according to the first embodiment.

FIG. 2 is a block diagram showing the first voice activity detection unit 102. As shown FIG. 2, the first voice activity detection unit 102 may include a first smoothing unit 201, a first threshold calculating unit 202, and a first voice activity determination unit 203. Each of these units may be hardware such as a circuit. Specifically, the first smoothing unit 201 may be a first smoothing circuit. The first threshold calculating unit 202 may be a first threshold calculating circuit. The first voice activity determination unit 203 may be a first voice activity determination circuit. On the other hand, each of these units may be realized by software and a CPU. The detail is described later.

The first smoothing unit 201 smooths the input power 602 based on the second signal, namely, the second parameter 604 (the second Boolean value 605 before the unit time). And the first smoothing unit 201 calculates a first smoothing power 611. The first smoothing unit 201 outputs the first smoothing power 611 to the first threshold calculating unit 202. If the second Boolean value 605 before the unit time is false (namely, a value indicating noise period), the first smoothing unit 201 smooths the input power 602. Then the first smoothing unit 201 updates the first smoothing power 611. On the other hand, if the second Boolean value 605 before the unit time is true (namely, a value indicating speech period), the first smoothing unit 201 does not update the first smoothing power 611. Therefore, the first smoothing power 611 is a smoothing value of noise power (an average value of the noise power). The method of the smoothing is not limited. For example, the input power 602 is smoothed by using a time constant filter whose time constant is "0.2".

The first threshold calculating unit 202 multiplies the first smoothing power 611 by a first coefficient 612 that is a value more than 1. Then first threshold calculating unit 202 calculates a first threshold 613. The first threshold calculating unit 202 outputs the first threshold 613 to the first voice activity determination unit 203. The first coefficient 612 may be "2".

The first voice activity determination unit 203 compares the first threshold 613 with the input power 602. Then the first voice activity determination unit 203 determines whether or not a period corresponding to the unit time is a speech period. Then the first voice activity determination unit 203 outputs the first signal, namely, the first parameter 603 (the first Boolean value). Specifically, if the input power 602 is bigger than the first threshold 613, the first voice activity determination unit 203 outputs "true" as the first Boolean value. On the other hand, if the input power 602 is smaller than the first threshold, the first voice activity determination unit 203 outputs "false" as the first Boolean value.

Figure 3:
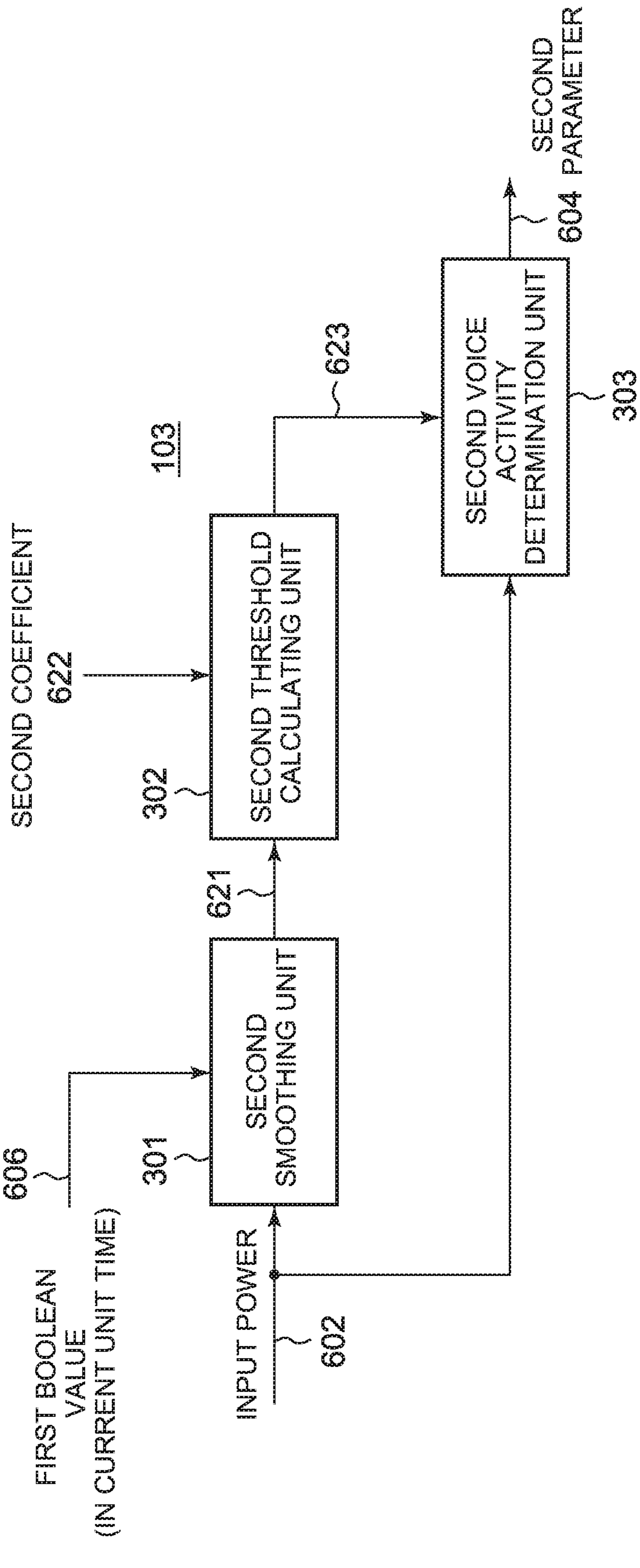
FIG. 3 is a block diagram showing a second voice activity detection unit according to the first embodiment.

FIG. 3 is a block diagram showing the second voice activity detection unit 103. As shown FIG. 3, the second voice activity detection unit 103 may include a second smoothing unit 301, a second threshold calculating unit 302, and a second voice activity determination unit 303. Each of these units may be hardware such as a circuit. Specifically, the second smoothing unit 301 may be a second smoothing circuit. The second threshold calculating unit 302 may be a second threshold calculating circuit. The second voice activity determination unit 303 may be a second voice activity determination circuit. On the other hand, each of these units may be realized by software and a CPU. The detail is described later.

The second smoothing unit 301 smooths the input power 602 based on the first signal, namely, the first parameter 603 (the first Boolean value 606 in current unit time). And the second smoothing unit 301 calculates a second smoothing power 621. The second smoothing unit 301 outputs the second smoothing power 621 to the second threshold calculating unit 302. If the first Boolean value 606 in the current unit time is "true" (namely, a value indicating speech period), the second smoothing unit 301 smooths the input power 602. Then the second smoothing unit 301 updates the second smoothing power 621. On the other hand, if the first Boolean value 606 in the current unit time is "false" (namely, a value indicating noise period), the second smoothing unit 301 does not update the second smoothing power 621. Therefore, the second smoothing power 621 is a smoothing value of speech power (an average value of the speech power). The method of the smoothing is not limited. For example, the input power 602 is smoothed by using a time constant filter whose time constant is 0.8.

In the time constant filter, a relationship between followability to a target signal and stability to a smoothed value is trade-off relationship. In the first embodiment, the stability is made much of. Therefore, a value of the time constant filter in the second smoothing unit 301 is bigger than a value of the time constant filter in the first smoothing unit 201.

The second threshold calculating unit 302 multiplies the second smoothing power 621 by a second coefficient 622 that is a value more than "0" and no more than "1". Then first threshold calculating unit 302 calculates a second threshold 623. The second threshold calculating unit 302 outputs the second threshold 623 to the second voice activity determination unit 303. The second coefficient 623 may be "0.5".

The second voice activity determination unit 303 compares the second threshold 623 with the input power 602. Then the second voice activity determination unit 303 determines whether or not a period corresponding to the unit time is the speech period. Then the second voice activity determination unit 303 outputs the second signal, namely, the second parameter 604 (the second Boolean value 605). Specifically, if the input power 602 is bigger than the second threshold 623, the second voice activity determination unit 303 outputs "true" as the second Boolean value 605. On the other hand, if the input power 602 is smaller than the second threshold 623, the second voice activity determination unit 303 outputs "false" as the second Boolean value 605.

The first voice activity detection unit 102 and/or the second voice activity detection unit 103 may execute a hangover processing. The details of the hangover processing will be described later.

Figure 23:
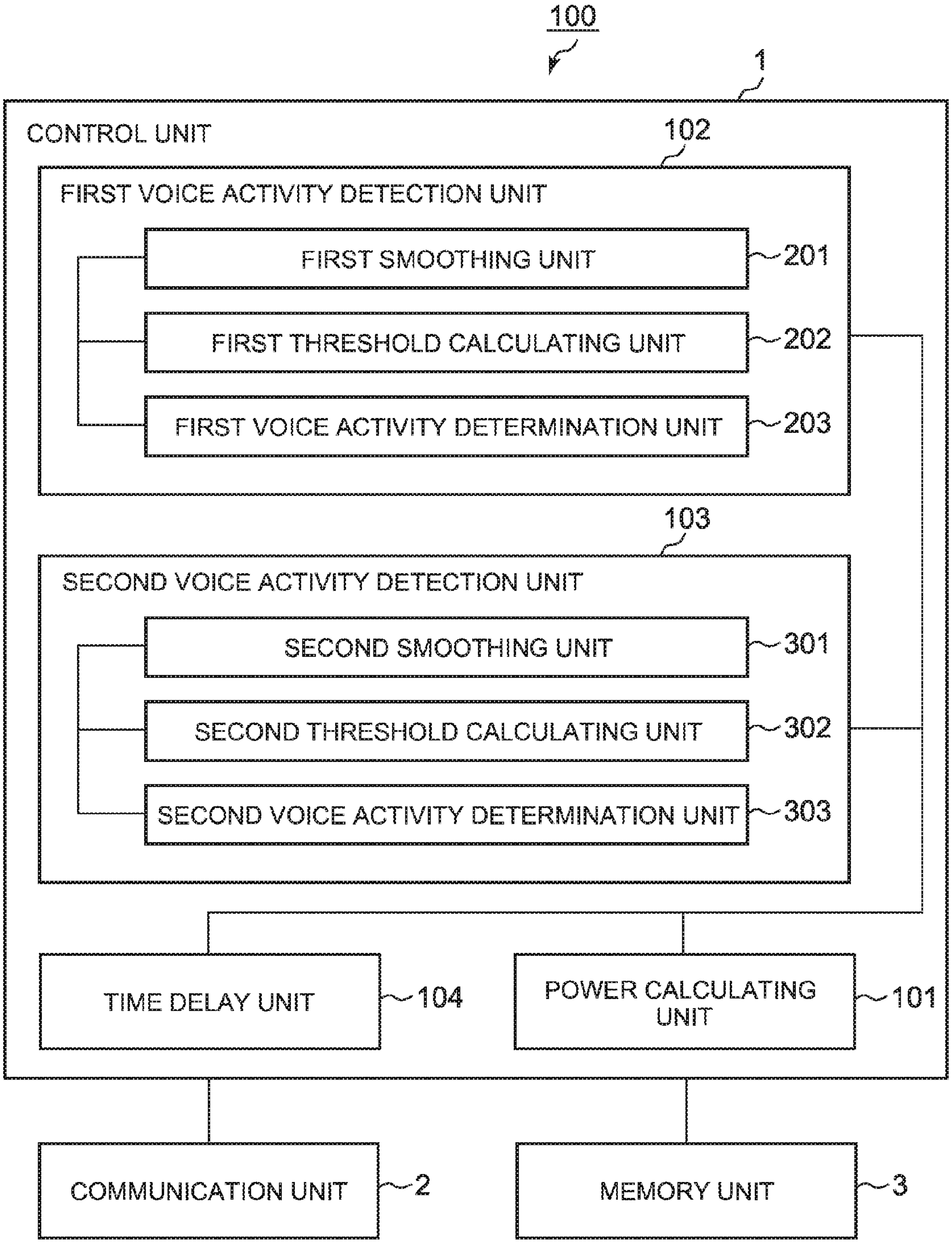
FIG. 23 is a block diagram showing the voice activity detection apparatus in case that each unit included in the voice activity detection apparatus is realized by a computing device.

FIG. 23 is a block diagram showing the voice activity detection apparatus 100 in case that the each unit included in the voice activity detection apparatus 100 is realized by software and the CPU.

As a shown FIG. 23, the voice activity detection apparatus 100 may include a control unit 1, a communication unit 2 and a memory unit 3.

The communication unit 2 receives the input signal 601 from the external apparatus. And the communication unit 2 transmits the detection result to the external apparatus.

The memory unit 3 may include a HDD (Hard Disk Drive), a flash memory or a part of a RAM (Random Access Memory). The memory unit 3 stores various software such as a control program (software) that controls the entire voice activity detection apparatus 100 or application software such as the voice activity detecting program.

The control unit 1 may include a CPU and the RAM. The control unit 1 read the software from the memory unit 3. The control unit 1 writes the software in the RAM. The control unit 1 controls the entire voice activity detection apparatus 100 based on the written software.

The control unit 1 may include the first voice activity detection unit 102, and the second voice activity detection unit 103, the delay unit 104 and the power calculating unit 101. Each of these units may be realized by software and the CPU.

The first voice activity detection unit 102 may include the first smoothing unit 201, the first threshold calculating unit 202 and the first voice activity determination unit 203. Each of these units may be realized by software and the CPU.

The second voice activity detecting unit 103 may include the second smoothing unit 301, the second threshold calculating unit 302 and the second voice activity determination unit 303. Each of those units may be realized by software and the CPU.

1-2. Processing

Next, processing of the voice activity detection apparatus 100 is explained.

Figure 4:
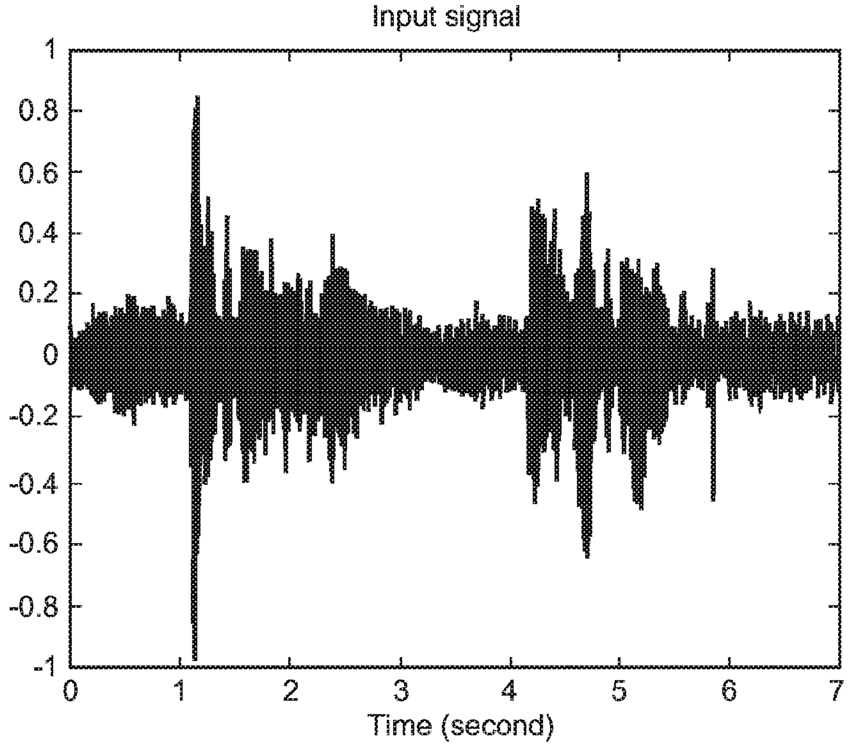
FIG. 4 is a waveform chart according to the input signal inputted to the voice activity detection apparatus.
Figure 5:
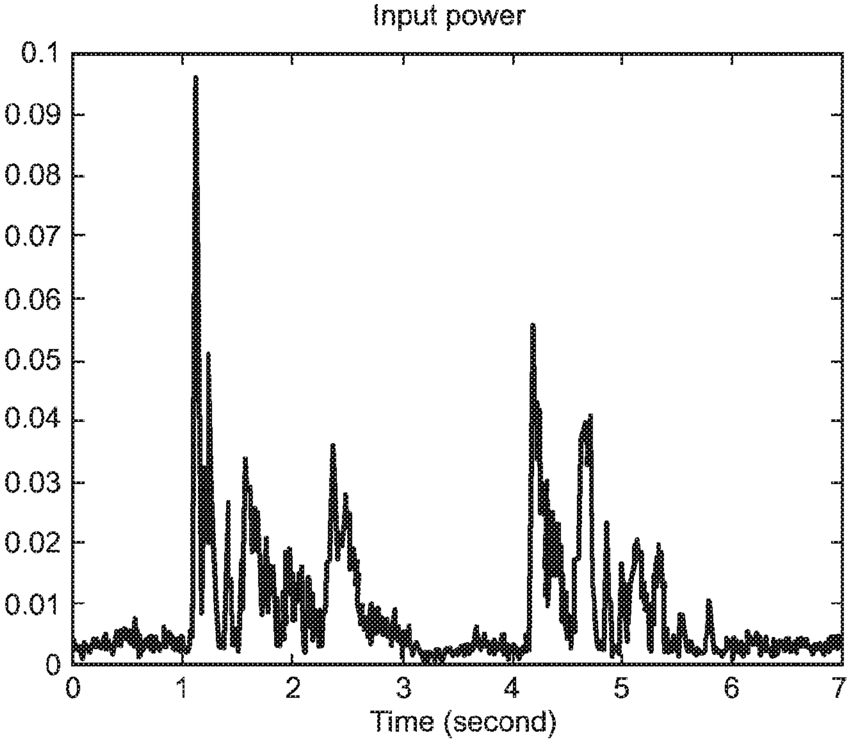
FIG. 5 is a waveform chart according to an input power.
Figure 6:
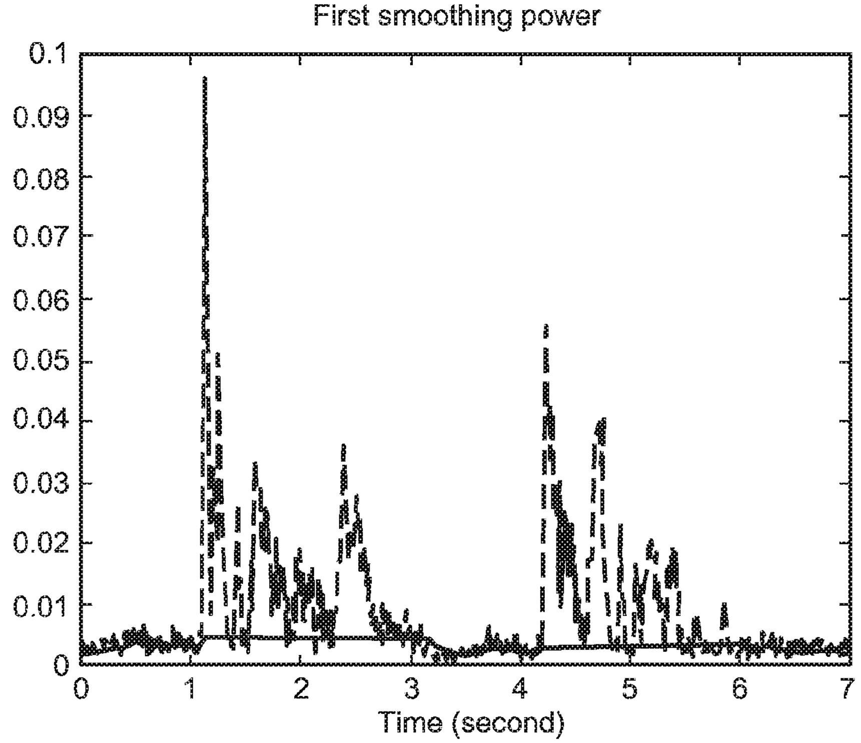
FIG. 6 is a waveform chart according to a first smoothing power.
Figure 7:
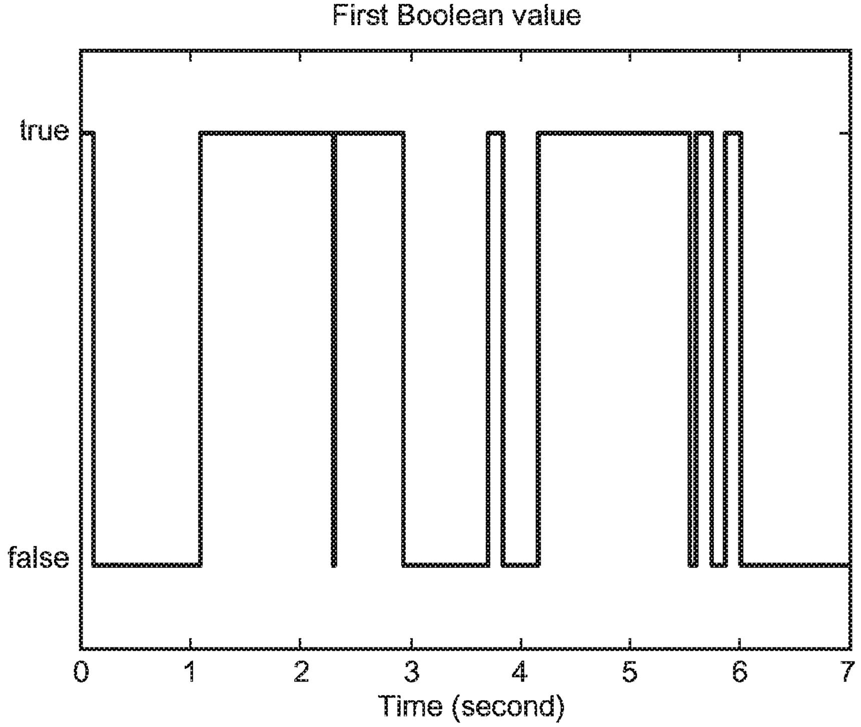
FIG. 7 is a waveform chart according to a first Boolean value.
Figure 8:
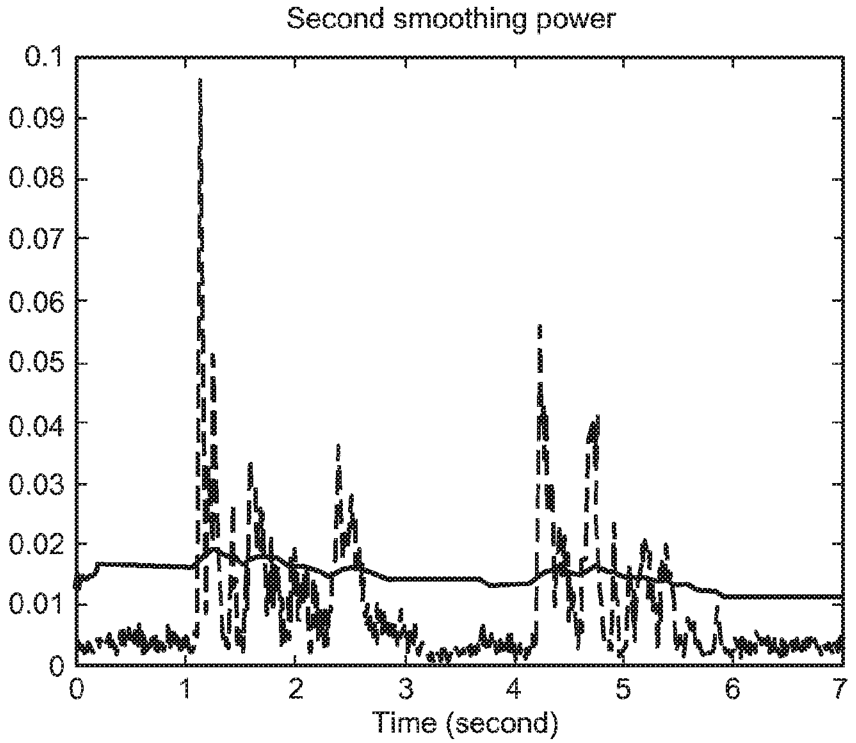
FIG. 8 is a waveform chart according to a second smoothing power.
Figure 9:
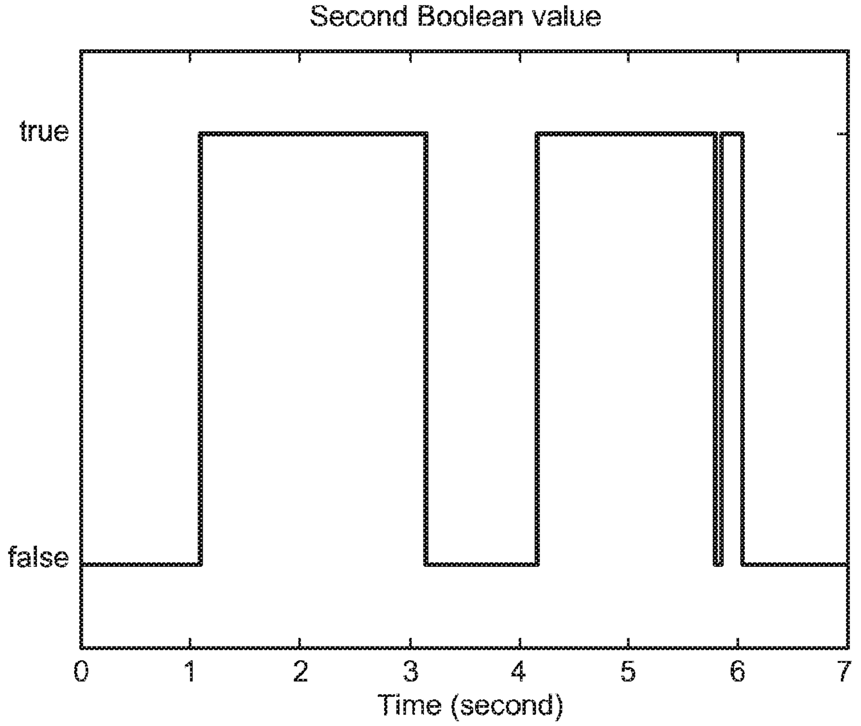
FIG. 9 is a waveform chart according to a second Boolean value.

FIG. 4 is a waveform chart according to the input signal 601 inputted to the voice activity detection apparatus 100. FIG. 5 is a waveform chart according to the input power 602. FIG. 6 is a waveform chart according to the first smoothing power 611. FIG. 7 is a waveform chart according to the first Boolean value 606. FIG. 8 is a waveform chart according to the second smoothing power 621. FIG. 9 is a waveform chart according to the second Boolean value 605. In FIG. 7 and FIG. 9, both the first voice activity determination unit 203 and the second voice activity determination unit 303 execute the hangover processing. And a first hangover time in the first voice activity determination unit 203 is shorter than a second hangover time in the second voice activity determination unit 303.

As shown FIG. 1, the input signal 601 shown FIG. 4 is received by the power calculating unit 101. The input power 602 of the input signal 601 per unit time is calculated by the power calculating unit 101. The input power 602 shown FIG. 5 is received by the first voice activity detection unit 102 and the second voice activity detection unit 103.

The second signal, namely, the second parameter 602 (the second Boolean value 605 before the unit time) is also received by the first voice activity detection unit 102. The process of the voice activity detection is executed by the first voice activity detection unit 102 by using the second Boolean value 605 and the input power 602. Then the first signal, namely, the first parameter 603 (the first Boolean value 606) shown FIG. 7 is outputted to the second voice activity detection unit 103 by the first voice activity detection unit 102.

The first signal, namely, the first parameter 603 (the first Boolean value 606) is also received by the second voice activity detection unit 103. The process of the voice activity detection is executed by the second voice activity detection unit 103 by using the first parameter 603 and the input power 602. Then the second signal, namely, the second parameter 604 (the second Boolean value 605) is outputted to the time delay unit 104 by the second voice activity detection unit 103. Then the second signal, namely, the second parameter 604 (the second Boolean value 605 before unit time) is outputted to the first voice activity detection unit 102 by the time delay unit 104. The second Boolean value 605 is also outputted to an external device by the second voice activity detection unit 103.

Next, processing of the first voice activity detection unit 102 is explained.

As shown FIG. 2, the input power 602 is smoothed based on the second signal, namely, the second parameter 604 (the second Boolean value 605 before the unit time) by the first smoothing unit 201. Specifically, if the second Boolean value 605 before the unit time is "false", the input power 602 is smoothed. Then the first smoothing power 611 shown in FIG. 6 is updated. On the other hand, if the second Boolean value 605 before the unit time is "true", the first smoothing power 611 is not updated. Namely, the first smoothing power 611 before unit time is maintained.

The first smoothing power 611 is outputted to the first threshold calculating unit 202. The first smoothing power 611 is multiplied by the first coefficient 612 by the first threshold calculating unit 202. As a result, first threshold 613 is calculated by the first threshold calculating unit 202. Then the first threshold 613 is compared with the input power 602 by the first voice activity determination unit 203. If the input power 602 is bigger than the first threshold 613, "true" as the first Boolean value 606 is outputted to the second voice activity detection unit 103 by the first voice activity determination unit 203. On the other hand, if the input power 602 is smaller than the first threshold 613, "false" as the first Boolean value 606 is outputted to the second voice activity detection unit 103 by the first voice activity determination unit 203.

Next, processing of the second voice activity detection unit 103 is explained.

As shown FIG. 3, the input power 602 is smoothed based on the first signal, namely, the first parameter 603 (the first Boolean value 606 in a current unit time) by the second smoothing unit 301. Specifically, if the first Boolean value 606 in the current unit is "true", the input power 602 is smoothed. Then the second smoothing power 621 shown in FIG. 8 is updated. On the other hand, if the first Boolean value 606 in the current unit is "false", the second smoothing power 621 is not updated. Namely, the second smoothing power 621 before unit time is maintained.

The second smoothing power 621 is outputted to the second threshold calculating unit 302. The second smoothing power 621 is multiplied by the second coefficient 622 by the second threshold calculating unit 302. As a result, the second threshold 623 is calculated by the second threshold calculating unit 302. Then the second threshold 623 is compared with the input power 602 by the second voice activity determination unit 303. If the input power 602 is larger than the second threshold 623, "true" as the second Boolean value 605 is outputted to the time delay unit 104 and the external apparatus. On the other hand, if the input power 602 is smaller than the second threshold 623, "false" as the second Boolean value 605 is outputted to the time delay unit 104 and the external apparatus.

Either the first voice activity determination unit 203 or the second voice activity determination unit 303 may execute the hangover processing. Both the first voice activity determination unit 203 and the second voice activity determination unit 303 may execute the hangover processing. Neither the first voice activity determination unit 203 nor the second voice activity determination unit 303 may execute the hangover processing.

Next, the hangover processing executed by at least one of the first voice activity determination unit 203 and the second voice activity determination 303 is explained.

The hangover processing executed by the first voice activity determination unit 203 is the same as the hangover processing executed by the second voice activity determination unit 303. Therefore, the hangover processing executed by the first voice activity determination unit 203 is only explained.

The first hangover time in the first voice activity determination unit 203 is determined beforehand. The first voice activity determination unit 203 compares the first threshold 613 with the input power 602. If the input power 602 is bigger than the first threshold 613, the first voice activity determination unit 203 outputs "true" as the first Boolean value 606. And the first voice activity determination unit 203 resets a value of an elapse time to "0". The elapse time is time elapsing from latest outputting of "true" as the first Boolean value 606. On the other hand, if the input power 602 is smaller than the first threshold 613 and the elapse time is smaller than the first hangover time, the first voice activity determination unit 203 outputs "true" as the first Boolean value 606. And the first voice activity determination unit 203 adds the unit time to the elapse time. On the other hand, if the input power 602 is smaller than the first threshold and the elapse time is larger than the first hangover time, the first voice activity determination unit 203 outputs "false" as the first Boolean value 606.

The first hangover time in the first voice activity determination unit 203 and the second hangover time in the second voice activity determination unit 303 may be same value. The first hangover time and the second hangover time may be different value. For example, the first hangover time may be shorter than the second hangover time. Specifically, the first hangover time may be 0.1 second. The second hangover time may be 0.2 second. The first Boolean value 606 is used for estimating the average of the speech power by the second voice activity detection unit 103. Therefore, it is prevented that the noise period is mistakenly determined as the speech period. The second Boolean value 605 is used for estimating the average of the noise power by the first voice activity detection unit 102. Therefore, it is prevented that the speech period is mistakenly determined as the noise period.

Figure 24:
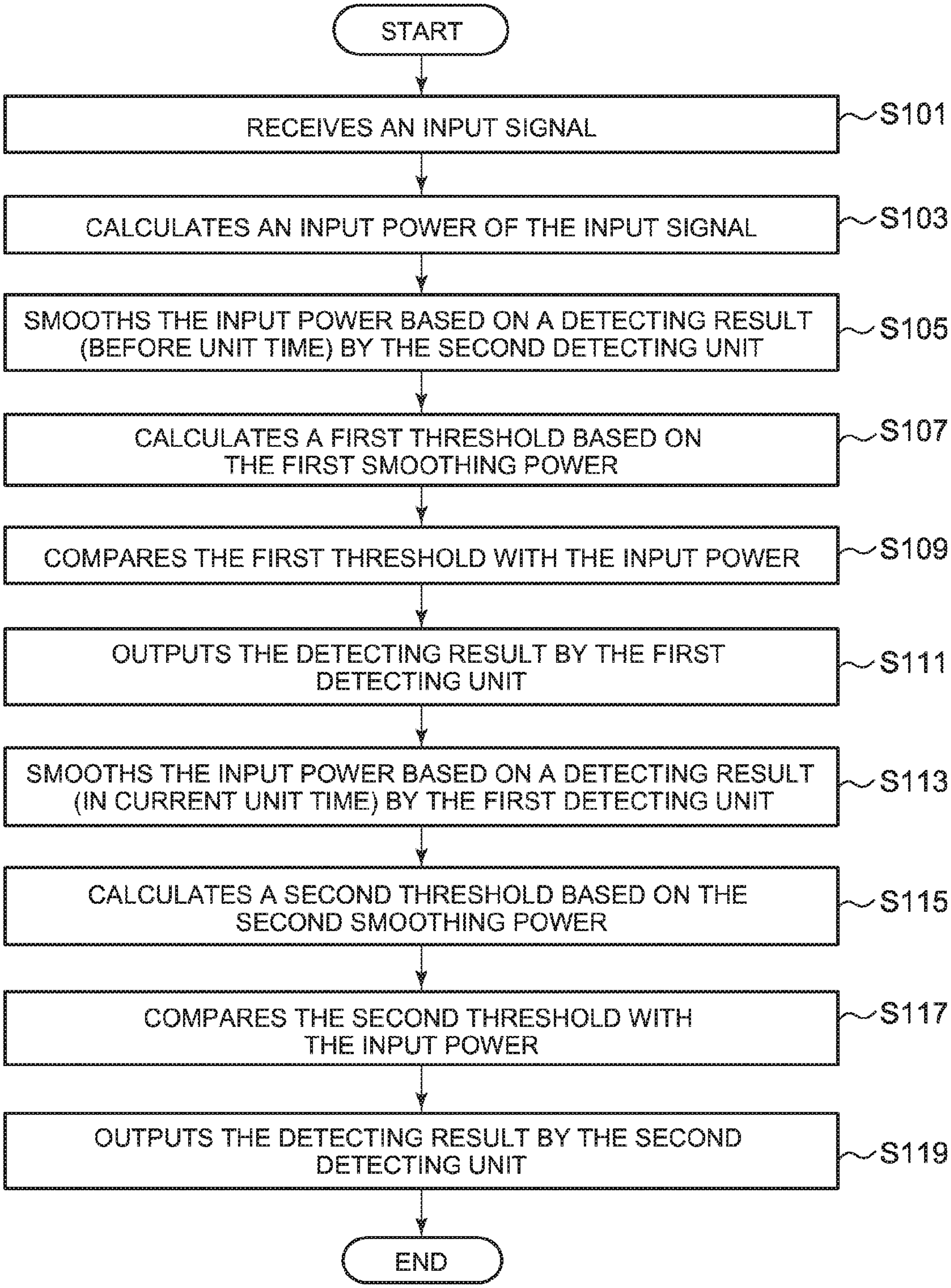
FIG. 24 is a flowchart showing a voice activity detection processing executed by the voice activity detection apparatus according to the first embodiment.

FIG. 24 is a flowchart showing a voice activity detection processing executed by the voice activity detection apparatus 100.

First, the communication unit 2 receives the input signal 601. Then the communication unit 2 outputs the input signal 601 to the power calculating unit 101. The power calculating unit 101 receives the input signal 601 (step S101). The power calculating unit 101 calculates input power 602 of the input signal 601 (step S103). The first smoothing unit 201 smooths the input power 602 based on the detecting result before unit time by the second detecting unit (the second voice activity determination unit 303) (step S105). The first threshold calculating unit 202 calculates the first threshold 613 based on the first smoothing power 611 (step S107). The first detecting unit (the first voice activity determination unit 203) compares the first threshold 613 with the input power 602 (step S109). Then the first voice activity determination unit 203 determines whether or not a period corresponding to the unit time is a speech period. Then the first voice activity determination unit 203 outputs the detecting result to the second smoothing unit 301 (step S111). The second smoothing unit 301 smooths the input power 602 based on the detecting result in current unit time by the first detecting unit (the first voice activity determination unit 203) (step S113). The second threshold calculating unit 302 calculates the second threshold 623 based on the second smoothing power 621 (step S115). The second detecting unit (the second voice activity determination unit 303) compares the second threshold 623 with the input power 602 (step S117). Then the second voice activity determination unit 303 determines whether or not a period corresponding to the unit time is a speech period. Then the second voice activity determination unit 303 outputs the detecting result to the external apparatus and the first smoothing unit 201 (step S119).

1-3. Effect

In first embodiment, the process of voice activity detection to the input signal is executed two times. The process in first time is executed by the first voice activity detection unit 102. The process in second time is executed by the second voice activity detection unit 103. And the process in second time is executed by using a result of the process in first time (feedforward). The process in first time is executed by using a previous result of the process in second time (feedback). Therefore, a precision of voice activity detection improves.

Specifically, a precision of result of the process in first time is better than a precision of result of voice activity detection without feedback. Then, the precision of voice activity detection improves more by the process in second time.

In addition, in the process in first time, the average of the noise power is estimated. Then the object sound period is detected by using the average of the noise power. On the other hand, in the process in second time, the average of the speech power is estimated. Then the object sound period is detected by using the average of the noise power. Therefore, the precision of voice activity detection improves.

According to the first embodiment, the first voice activity detection unit 102 estimates the first smoothing power 611 as the average value of the noise power and the first Boolean value 606 as detecting result based on the second Boolean value 605. The second voice activity detection unit 103 estimates the second smoothing power 621 as the average value of the speech power and the second Boolean value 605 as detecting result based on the first Boolean value 606. Namely, the first activity detection unit 102 and the second activity detection unit 103 supplement each other's detecting results. Therefore, the precision of voice activity detection improves.

1-4. Modification of the First Embodiment

Figure 10:
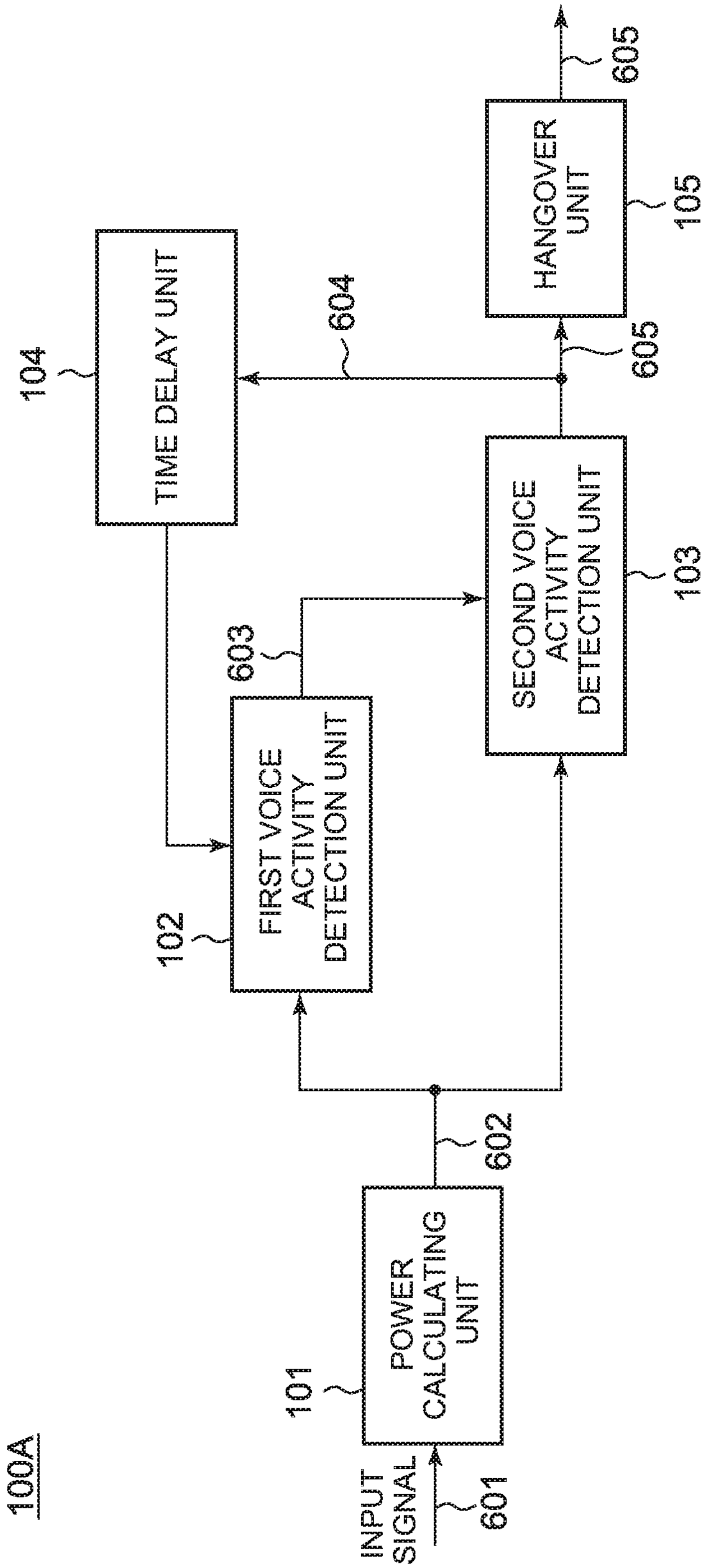
FIG. 10 is a block diagram showing a voice activity detection apparatus according to the modification the first embodiment.

FIG. 10 is a block diagram showing a voice activity detection apparatus 100A.

As shown in FIG. 10, the voice activity detection apparatus 100A may include a power calculating unit 101, a first voice activity detection unit 102, a second voice activity detection unit 103, a time delay unit 104 and a hangover unit 105. The second voice activity detection unit 103 does not execute a hangover processing. Namely, the second voice activity determination unit 303 does not execute the hangover processing. The second voice activity detection unit 103 outputs the second signal, namely, the second parameter 604 to the first voice activity detection unit 102 through the time delay unit 104. And the second voice activity detection unit 103 outputs the second signal, namely, the second parameter 604 (the second Boolean value 605) as the detection result by the voice activity detection apparatus 100 through the hangover unit 105.

The hangover unit 105 determines the third hangover time beforehand. If the inputted second signal, namely, the second parameter 604 (the inputted second Boolean value 605) is "true", the hangover unit 105 outputs "true" as the second Boolean value 605. And the hangover unit 105 resets the value of the elapse time to "0". On the other hand, if the inputted second signal, namely, the second parameter 604 is "false" and the elapse time is smaller than the third hangover time, the hangover unit 105 outputs "true" as the second Boolean value 605. And the hangover unit 105 adds the unit time to the elapse time. On the other hand, if the inputted second signal, namely, the second parameter 604 is "false" and the elapse time is bigger than the third hangover time, the hangover unit 105 outputs "false" as the second Boolean value 605. The third hangover time may be 0.5 second.

2. Second Embodiment 2-1. Structure

Figure 11:
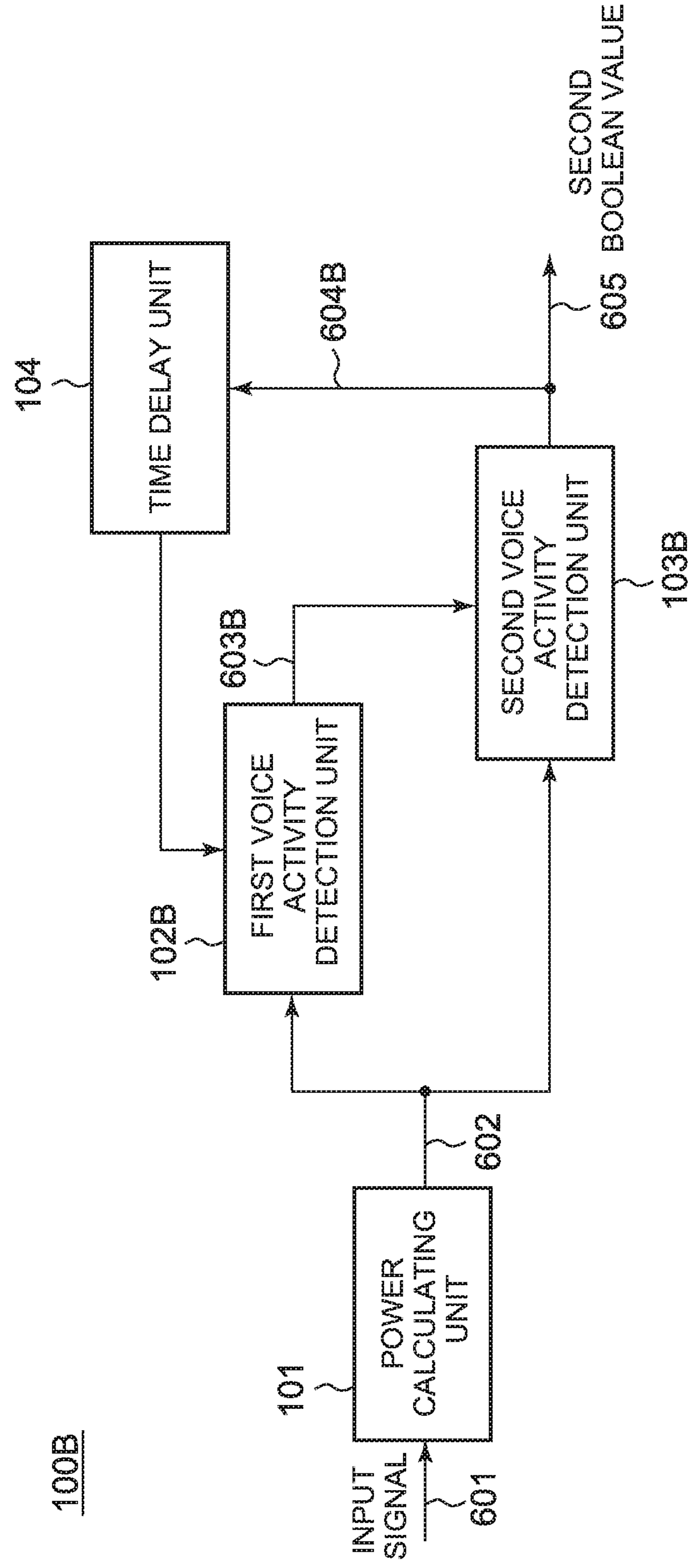
FIG. 11 is a block diagram showing a voice activity detection apparatus according to the second embodiment.

FIG. 11 is a block diagram showing a voice activity detection apparatus 100B.

As shown in FIG. 11, the voice activity detection apparatus 100B may include a power calculating unit 101, a first voice activity detection unit 102B, a second voice activity detection unit 103B, and a time delay unit 104.

The power calculating unit 101 calculates input power 602 of an input signal 601 per unit time. The power calculating unit 101 outputs the input power 602 to the first voice activity detection unit 102B and the second voice activity detection unit 103B.

The first voice activity detection unit 102B executes a process of the voice activity detection by using a second parameter 604B and the input power 602. The second parameter 604B may include a second Boolean value 605 that is a detection result before the unit time by the second voice activity detection unit 103B and a second smoothing power 621 that is calculated before unit time by the second voice activity detection unit 103B. Then the first voice activity detection unit 102B outputs a first parameter 603B to the second voice activity detection unit 103B. The first parameter 603B may include a first Boolean value 606 that is detection result in the voice activity detection by the first voice activity detection unit 102B and a first smoothing power 611 that is calculated by the first voice activity detection unit 102B.

The second voice activity detection unit 103B executes a process of the voice activity detection by using the first parameter 603B and the input power 602. Then second voice activity detection unit 103B outputs a second parameter 604B to the first voice activity detection unit 102B through the time delay unit 104. And the second voice activity detection unit 102B outputs the second Boolean value 605 as a detection result by the voice activity detection apparatus 100B. The second parameter 604B may include the second Boolean value 605 that is a detection result in the voice activity detection by the second voice activity detection unit 103B and the second smoothing power 621 that is calculated by the second voice activity detection unit 103B.

The time delay unit 104 receives the second parameter 604B from the second voice activity detection unit 103B. After progress in the unit time, the time delay unit 104 outputs the second parameter 604B as the second parameter 604B including the second Boolean value 605 that is a detection result before the unit time and the second smoothing power 621 that is calculated before unit time by the second voice activity detection unit 103B.

Figure 12:
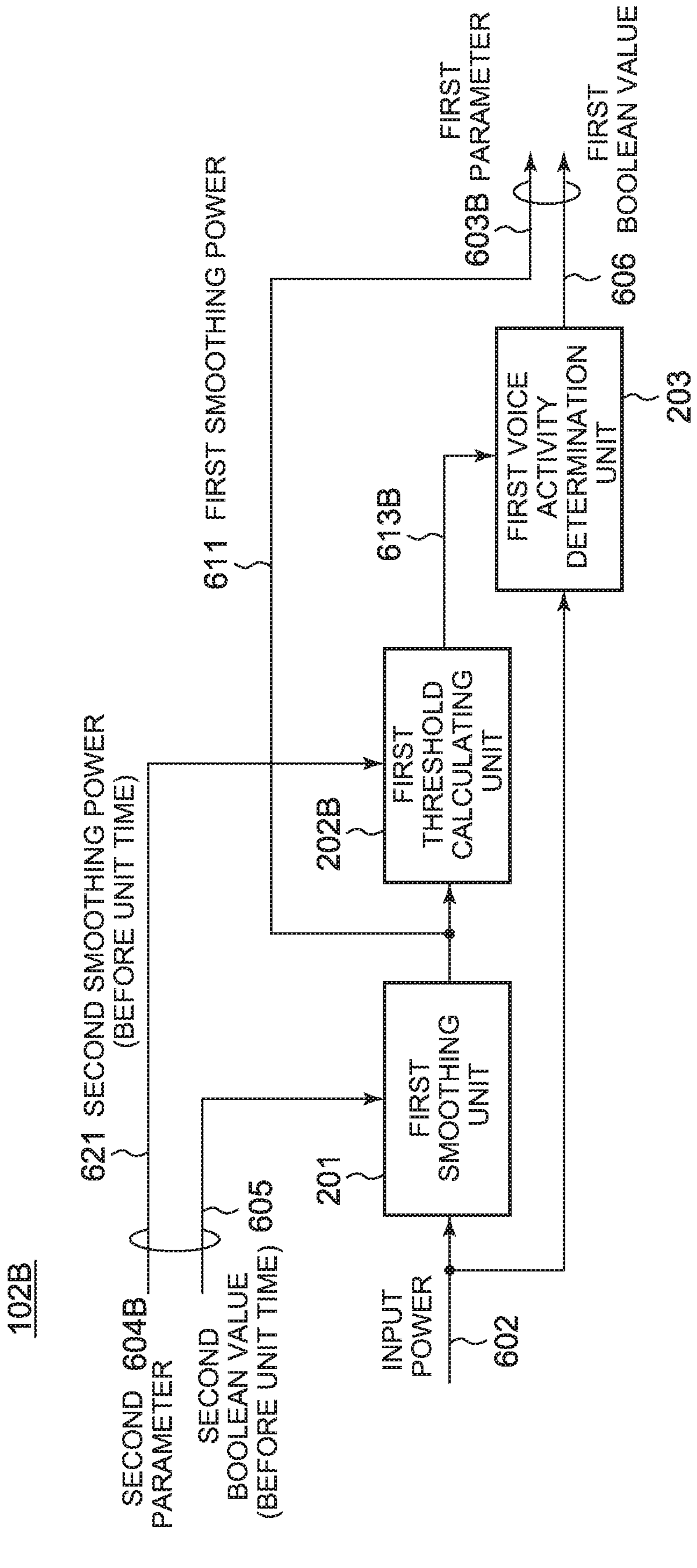
FIG. 12 is a block diagram showing a first voice activity detection unit according to the second embodiment.

FIG. 12 is a block diagram showing the first voice activity detection unit 102B.

As shown FIG. 12, the first voice activity detection unit 102B may include a first smoothing unit 201, a first threshold calculating unit 202B, and a first voice activity determination unit 203. The first smoothing unit 201 and the first voice activity determination unit 203 are same as the structure in the first embodiment. Therefore the explanation is omitted.

The first threshold calculating unit 202B calculates a first threshold 613B based on the first smoothing power 611 outputted by the first smoothing unit 201 and the second smoothing power 621 before the unit time outputted by the time delay unit 104. The first threshold calculating unit 202B outputs the first threshold 613B to the first voice activity determination unit 203.

The first smoothing power 611 indicates the average value of the noise power. The second smoothing power 621 before unit time indicates the average value of the speech power before unit time. Therefore, it is preferred that the first threshold 613B is an average value between the first smoothing power 611 and the second smoothing power 621. The average value may be an arithmetical average value. The average value may be a geometrical average value.

If the first threshold 613B is not the average value, it is preferred that the first threshold 613B is bigger than the first smoothing power 611 and is smaller than the average value.

The first voice activity detection unit 102B outputs a first parameter 603B to the second voice activity detection unit 103B. The first parameter 603B includes the first smoothing power 611 outputted by the first smoothing unit 201 and the first Boolean value 606 outputted by the first voice activity determination unit 203.

Figure 13:
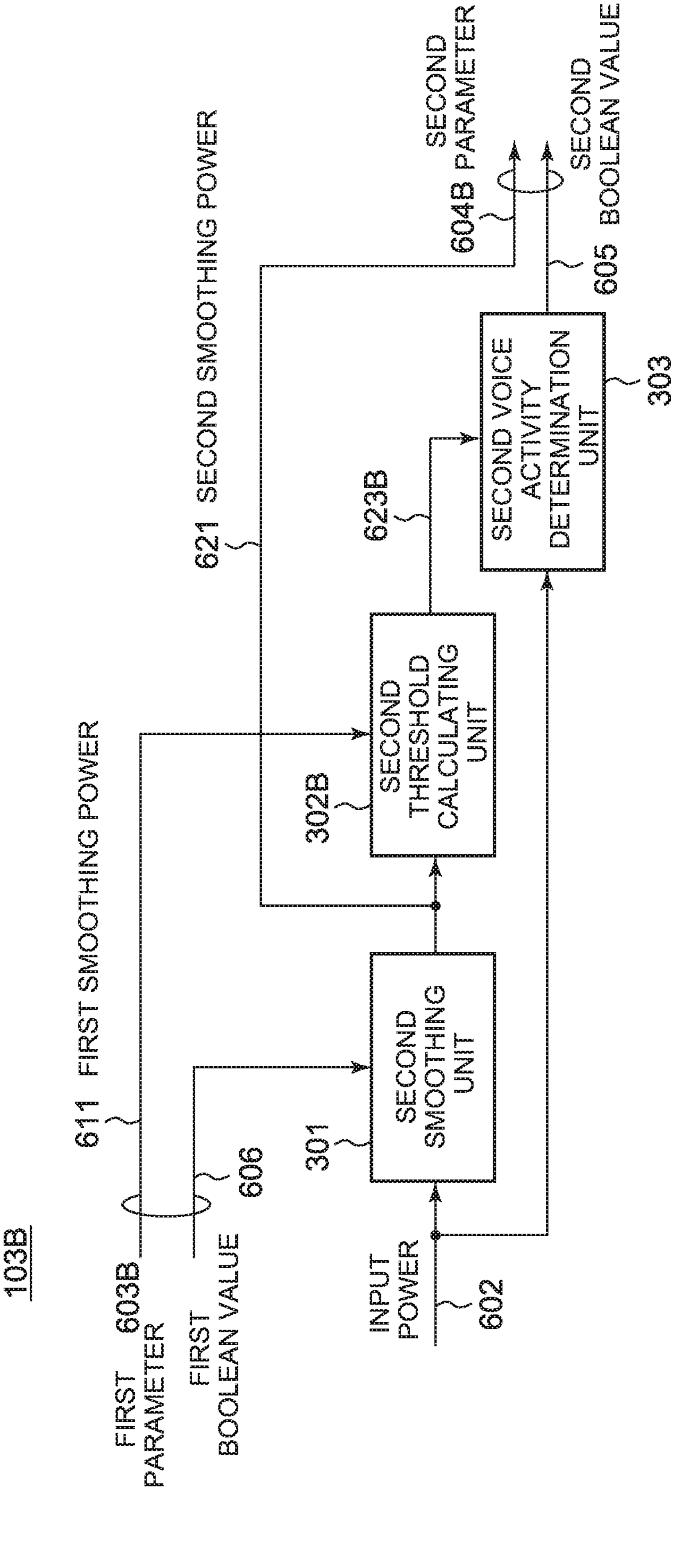
FIG. 13 is a block diagram showing a second voice activity detection unit according to the second embodiment.

FIG. 13 is a block diagram showing the second voice activity detection unit 103B.

As shown FIG. 13, the second voice activity detection unit 103B may include a second smoothing unit 301, a second threshold calculating unit 302B, and a second voice activity determination unit 303. The second smoothing unit 301 and the second voice activity determination unit 303 are same as the structure in the first embodiment. Therefore the explanation is omitted.

The second threshold calculating unit 302B calculates a second threshold 623B based on the second smoothing power 621 outputted by the second smoothing unit 301 and the first smoothing power 611 in same unit time included in the first parameter 603B outputted by the first voice activity detection unit 102B. The second threshold calculating unit 302B outputs the second threshold 623B to the second voice activity determination unit 303.

The second smoothing power 621 indicates the average value of the speech power. The first smoothing power 611 in same unit time indicates the average value of the noise power. Therefore, it is preferred that the second threshold 623B is an average value between the second smoothing power 621 and the first smoothing power 611. The average value may be an arithmetical average value. The average value may be a geometrical average value.

If the second threshold 623B is not the average value, it is preferred that the second threshold 623B is bigger than the first smoothing power 611 and is smaller than the average value.

The second voice activity detection 103B outputs a second parameter 604B to the time delay unit 104. The second voice activity detection 103B outputs the second Boolean value 605 to the external apparatus. The second parameter 604B includes the second smoothing power 621 and the second Boolean value 605.

2-2. Processing

Next, processing of the voice activity detection apparatus 100B is explained. The processing of the voice activity detection apparatus 100 and the processing of the voice activity detection apparatus 100B are same as the processing in the first embodiment. Therefore the explanation is omitted.

Figure 14:
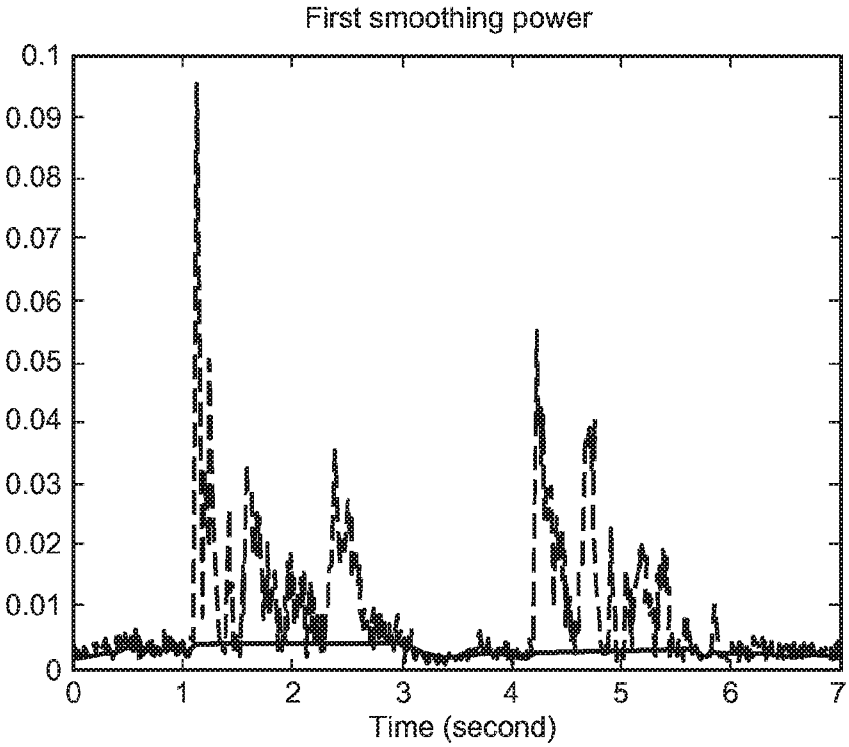
FIG. 14 is a waveform chart according to the first smoothing power.
Figure 15:
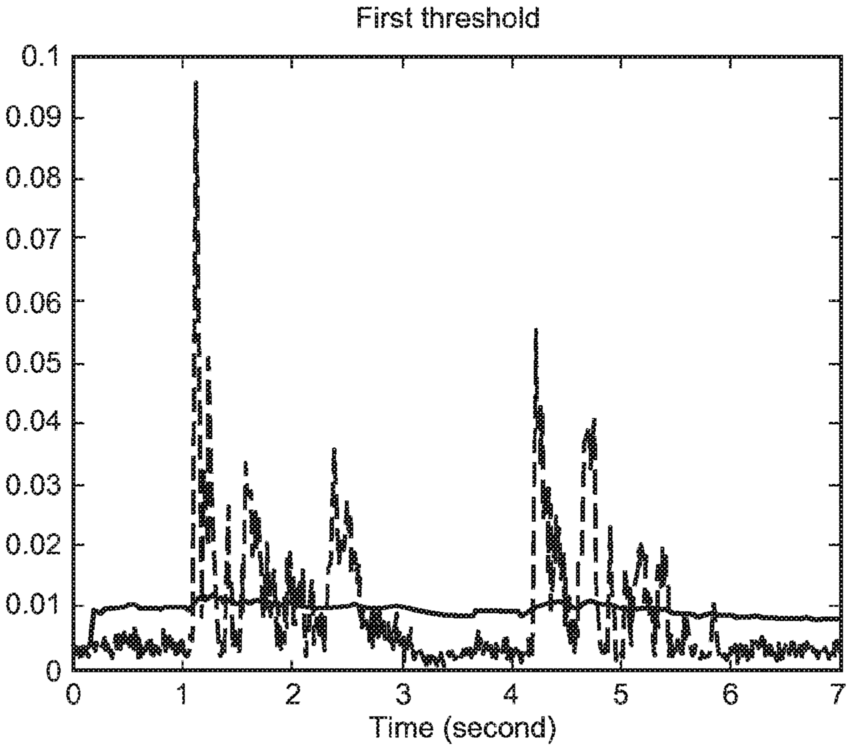
FIG. 15 is a waveform chart according to the first threshold.
Figure 16:
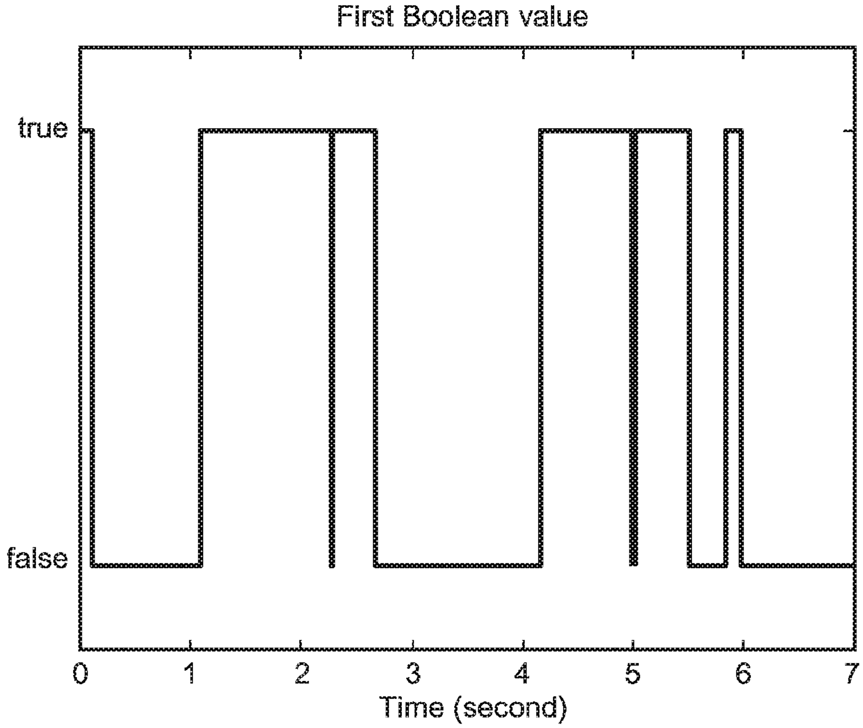
FIG. 16 is a waveform chart according to the first Boolean value.
Figure 17:
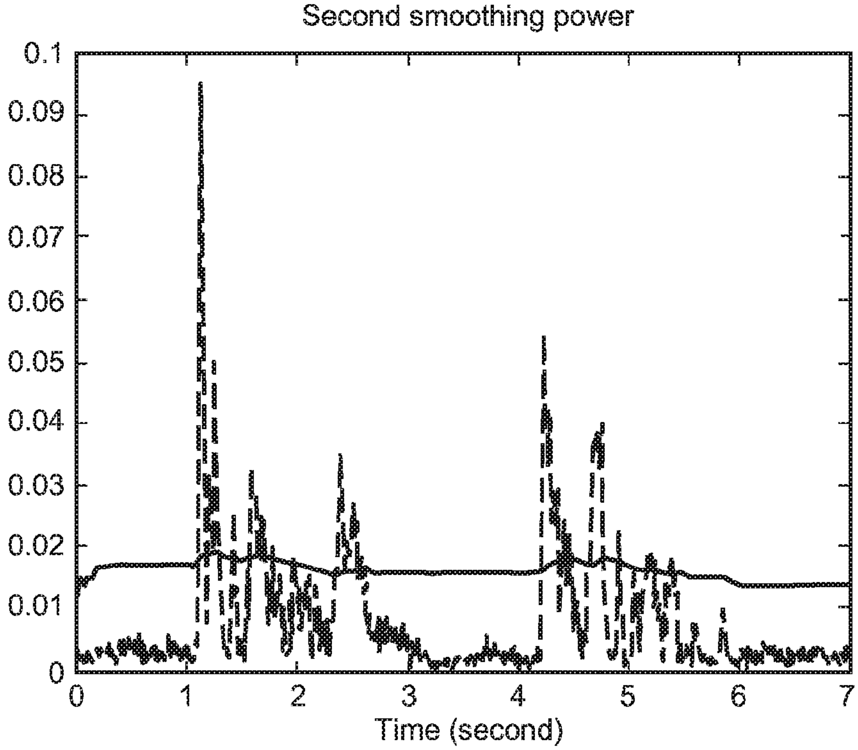
FIG. 17 is a waveform chart according to the second smoothing power.
Figure 18:
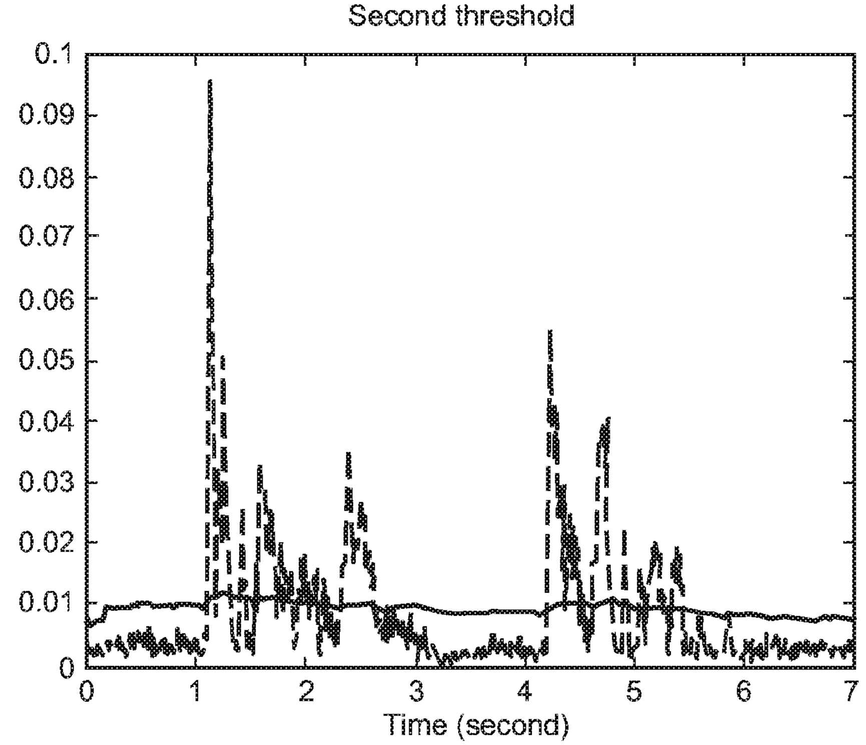
FIG. 18 is a waveform chart according to the second threshold.
Figure 19:
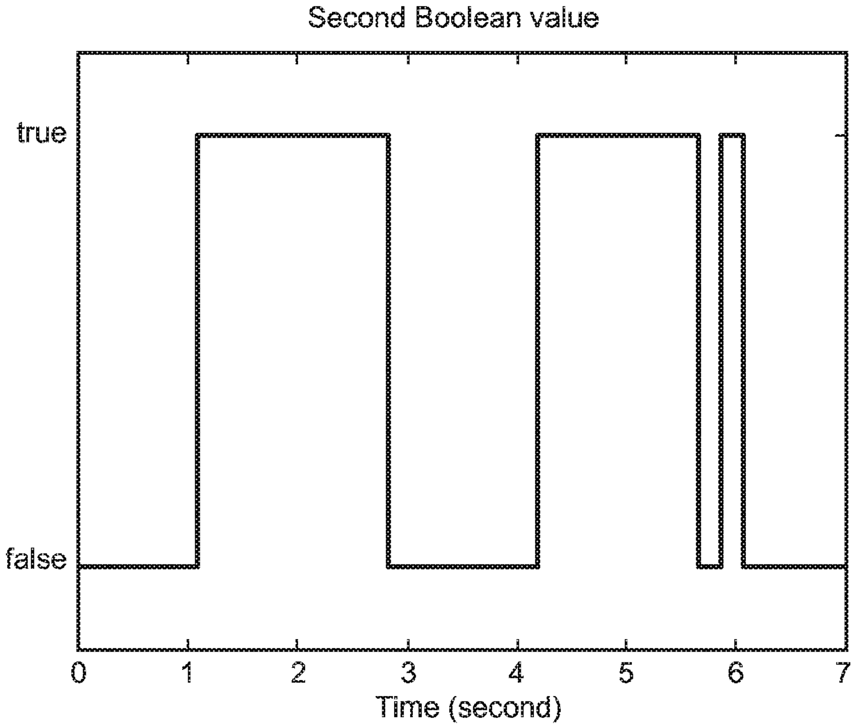
FIG. 19 is a waveform chart according to the second Boolean value.

FIG. 14 is a waveform chart according to the first smoothing power 611. FIG. 15 is a waveform chart according to the first threshold 613B. The FIG. 16 is a waveform chart according to the first Boolean value 606. FIG. 17 is a waveform chart according to the second smoothing power 621. FIG. 18 is a waveform chart according to the second threshold 623B. FIG. 19 is a waveform chart according to the second Boolean value 605.

First, processing of the first voice activity detection unit 102B is explained.

As shown FIG. 12, the input power 602 is smoothed based on the second Boolean value 605 before the unit time shown FIG. 19 by the first smoothing unit 201. Then the first smoothing power 611 shown in FIG. 14 is calculated. The first smoothing power 611 is outputted to the first threshold calculating unit 202B. The second smoothing power 621 before unit time shown in FIG. 17 is also outputted to the first threshold calculating unit 202B. The first threshold 613B shown in FIG. 15 is calculated based on the first smoothing power 611 and the second smoothing power 621 before unit time by the first threshold calculating unit 202B. Then the first threshold 613B is outputted to the first voice activity determination unit 203. Then the first threshold 613B is compared with the input power 602 by the first voice activity determination unit 203. If the input power 602 is bigger than the first threshold 613B, "true" as the first Boolean value 606 shown in FIG. 16 is calculated. On the other hand, if the input power 602 is smaller than the first threshold 613B, "false" as the first Boolean value 602 shown in FIG. 16 is calculated. Then the first parameter 603B including the first smoothing power 611 outputted by the first smoothing unit 201 and the first Boolean value 606 outputted by the first voice activity determination unit 203, is outputted to the second voice activity detection unit 103B.

Next, processing of the second voice activity detection unit 103B is explained.

As shown FIG. 13, the input power 602 is smoothed based on the first Boolean value 606 in same unit time shown in FIG. 16 by the second smoothing unit 301. Then the second smoothing power 621 shown in FIG. 17 is outputted to the second threshold calculating unit 302B. The first smoothing power 611 in same unit time shown in FIG. 14 is also outputted to the second threshold calculating unit 302B. The second threshold 623B shown in FIG. 18 is calculated based on the second smoothing power 621 and the first smoothing power 611 by the second threshold calculating unit 302B. Then the second threshold 623B is outputted to the second voice activity determination unit 303. Then the second threshold 623B is compared with the input power 602 by the second voice activity determination unit 303. If the input power 602 is larger than the second threshold 623B, "true" as the second Boolean value 605 shown in FIG. 19 is calculated. On the other hand, if the input power 602 is smaller than the second threshold 623B, "false" as the second Boolean value 605 shown in FIG. 19 is calculated. Then the second parameter 604B including the second smoothing power 621 outputted by the second smoothing unit 301 and the second Boolean value 605 outputted by the second voice activity detection unit 103B, is outputted to the first voice activity detection unit 102B through the time delay unit 104. And the second Boolean value 605 is outputted by the second voice activity detection unit 103B, to the external apparatus.

Either the first voice activity determination unit 203 or the second voice activity determination unit 303 may execute the hangover processing. Both the first voice activity determination unit 203 and the second voice activity determination unit 303 may execute the hangover processing. Neither the first voice activity determination unit 203 nor the second voice activity determination unit 303 may execute the hangover processing. The first hangover time may be 0.1 second. The second hangover time may be 0.2 second.

Figure 25:
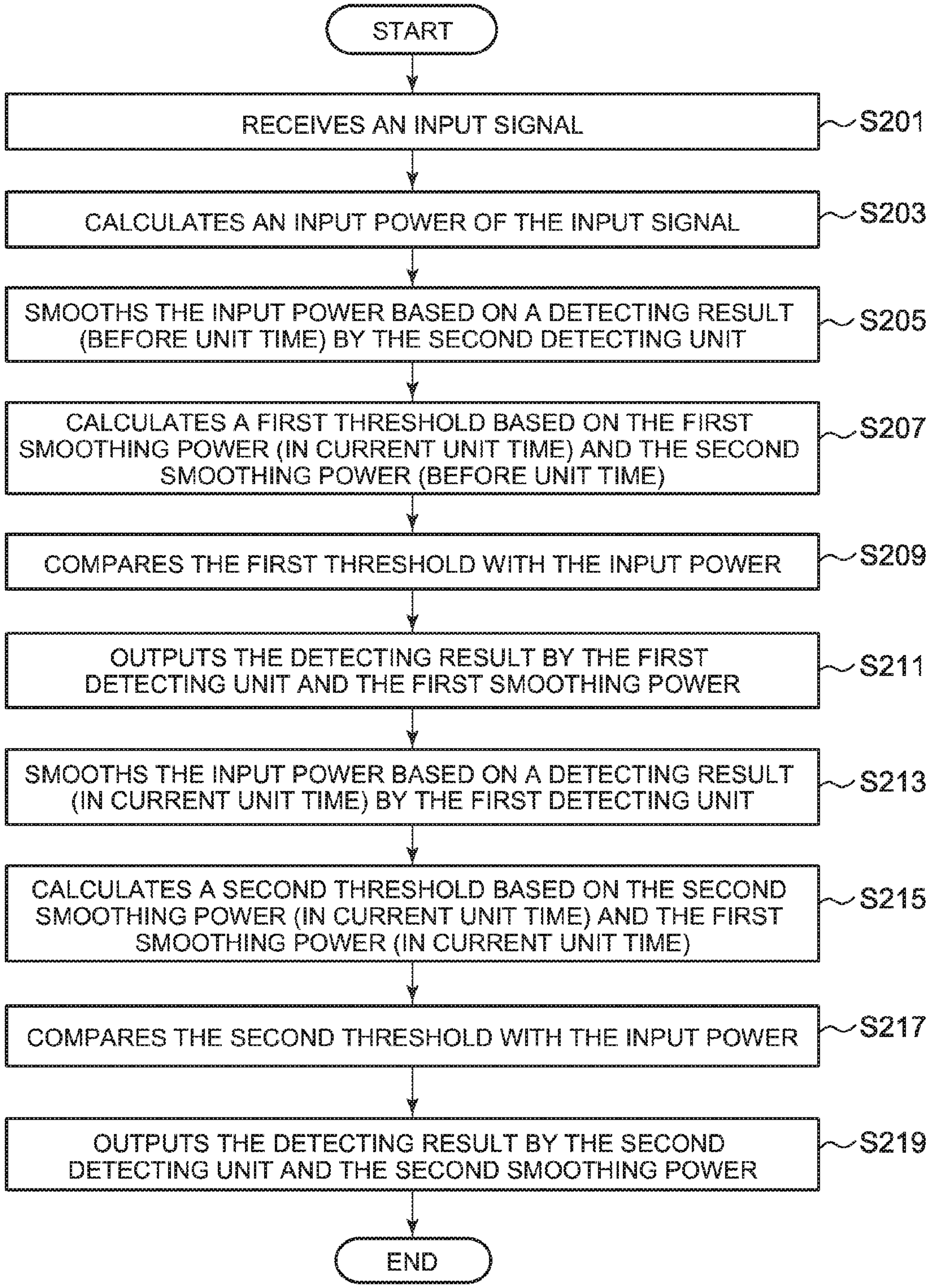
FIG. 25 is a flowchart showing a voice activity detection processing executed by the voice activity detection apparatus according to the second embodiment.

FIG. 25 is a flowchart showing a voice activity detection processing executed by the voice activity detection apparatus 100B.

First, the communication unit 2 receives the input signal 602. Then the communication unit 2 outputs the input signal 601 to the power calculating unit 101. The power calculating unit 101 receives the input signal 601 (step S201). The power calculating unit 101 calculates input power 602 of the input signal 601 (step S203). The first smoothing unit 201 smooths the input power 602 based on the detecting result before unit time by the second detecting unit (the second voice activity determination unit 303) (step S205). The first threshold calculating unit 202B calculates the first threshold 613B based on the first smoothing power 611 in current unit time and the second smoothing power 621 before unit time (step S207). The first detecting unit (the first voice activity determination unit 203) compares the first threshold 613B with the input power 602 (step S209). Then the first voice activity determination unit 203 determines whether or not a period corresponding to the unit time is a speech period. Then the first voice activity determination unit 203 outputs the detecting result to the second smoothing unit 301. And the first smoothing unit 201 outputs the first smoothing power 611 to the first threshold calculating unit 202B (step S211). The second smoothing unit 301 smooths the input power 602 based on the detecting result in current unit time by the first detecting unit by the first detecting unit (the first voice activity determination unit 203) (step S213). The second threshold calculating unit 302B calculates the second threshold 623B based on the second smoothing power 621 in current unit time and the first smoothing power 611 in current unit time (step S215). The second detecting unit (the second voice activity determination unit 303 compares the second threshold 623B with the input power 602 (step S217). Then the second voice activity determination unit 303 determines whether or not a period corresponding to the unit time is a speech period. Then the second voice activity determination unit 303 outputs the detecting result to the external apparatus and the first smoothing unit 201. And the second smoothing unit 301 outputs the second mooting power 621 to the first threshold calculating unit 202B (step S219).

2-3. Effect

According to the second embodiment, the first voice activity detection unit 102 estimates the first smoothing power 611 as the average value of the noise power and the first Boolean value 606 as detecting result based on the second Boolean value 605. The second voice activity detection unit 103 estimates the second smoothing power 621 as the average value of the speech power and the second Boolean value 605 as detecting result based on the first Boolean value 606. Namely, the first activity detection unit 102 and the second activity detection unit 103 supplement each other's detecting results. Therefore, the precision of voice activity detection improves.

In addition, the precision of voice activity detection improves without depending on a power balance between the noise power and the speech power.

3. Third Embodiment 3-1. Structure

Figure 20:
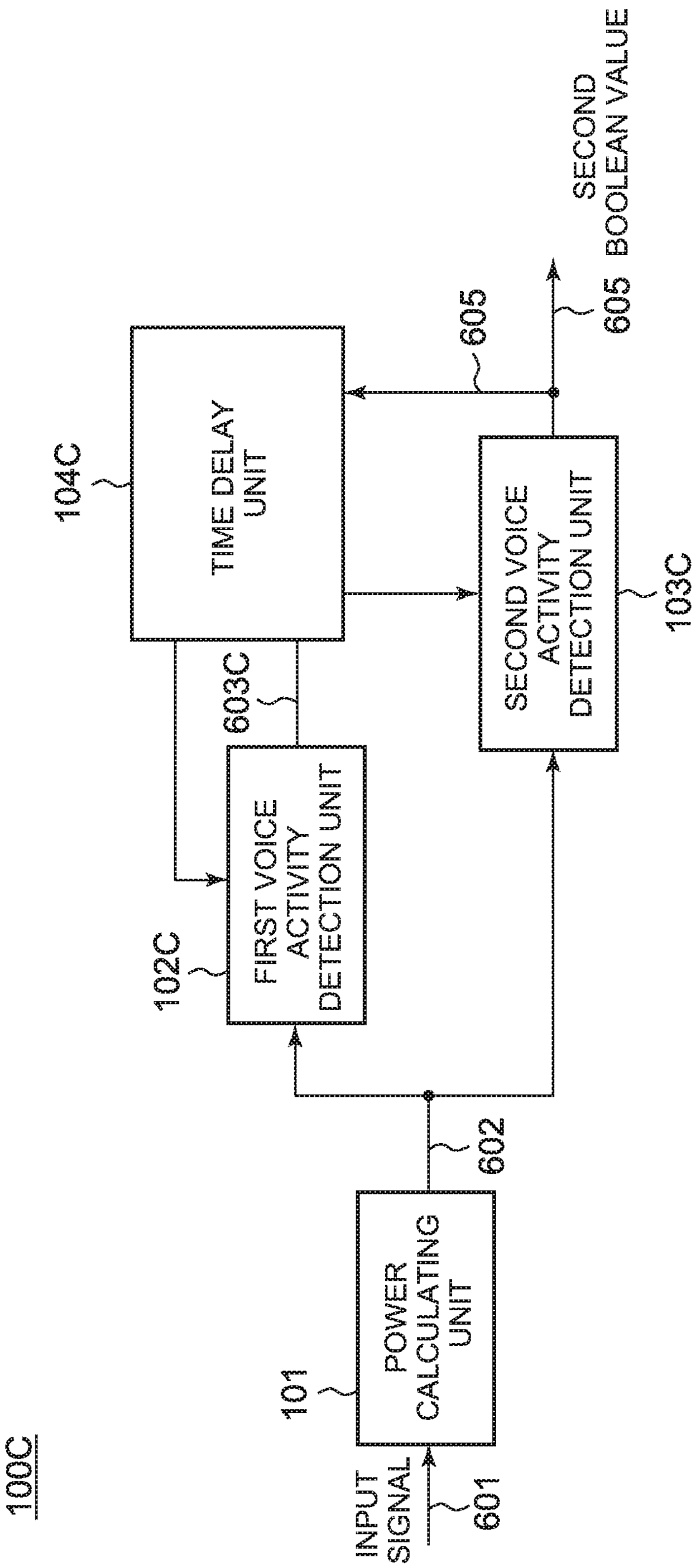
FIG. 20 is a block diagram showing a voice activity detection apparatus according to the third embodiment.

FIG. 20 is a block diagram showing a voice activity detection apparatus 100C.

As shown in FIG. 20, the voice activity detection apparatus 100C may include a power calculating unit 101, a first voice activity detection unit 102C, a second voice activity detection unit 103C, and a time delay unit 104C.

The power calculating unit 101 calculates input power 602 of an input signal 601 per unit time. The power calculating unit 101 outputs the input power 602 to the first voice activity detection unit 102C and the second voice activity detection unit 103C.

The first voice activity detection 102C executes a process of the voice activity detection by using the second Boolean value 605 before the unit time and the input power 602. Then the first voice activity detection unit 102C outputs a first parameter 603C to the second voice activity detection unit 103C through the time delay unit 104C. The first parameter 603C may include the first Boolean value 606 and the first smoothing power 611.

The second voice activity detection 103C executes a process of the voice activity detection by using the first parameter 603 before unit time and the input power 602. Then second voice activity detection 103C outputs a second Boolean value 605 to the first voice activity detection unit 102C through the time delay unit 104C. And the second voice activity detection unit 103C outputs the second Boolean value 605 as a detection result by the voice activity detection apparatus 100C.

The time delay unit 104C receives the second Boolean value 605 from the second voice activity detection unit 103C. After progress in the unit time, the time delay unit 104C outputs the second Boolean value 605 that is a detection result before the unit time. And the time delay unit 104C receives the first parameter 603C from the first voice activity detection unit 102C. After progress in the unit time, the time delay unit 104 outputs the first parameter 603C including the first Boolean value 606 that is detection result before the unit time and the first smoothing power 611 that is calculated before unit time. The first parameter 603C may be outputted directly without the time delay unit 104C.

Figure 21:
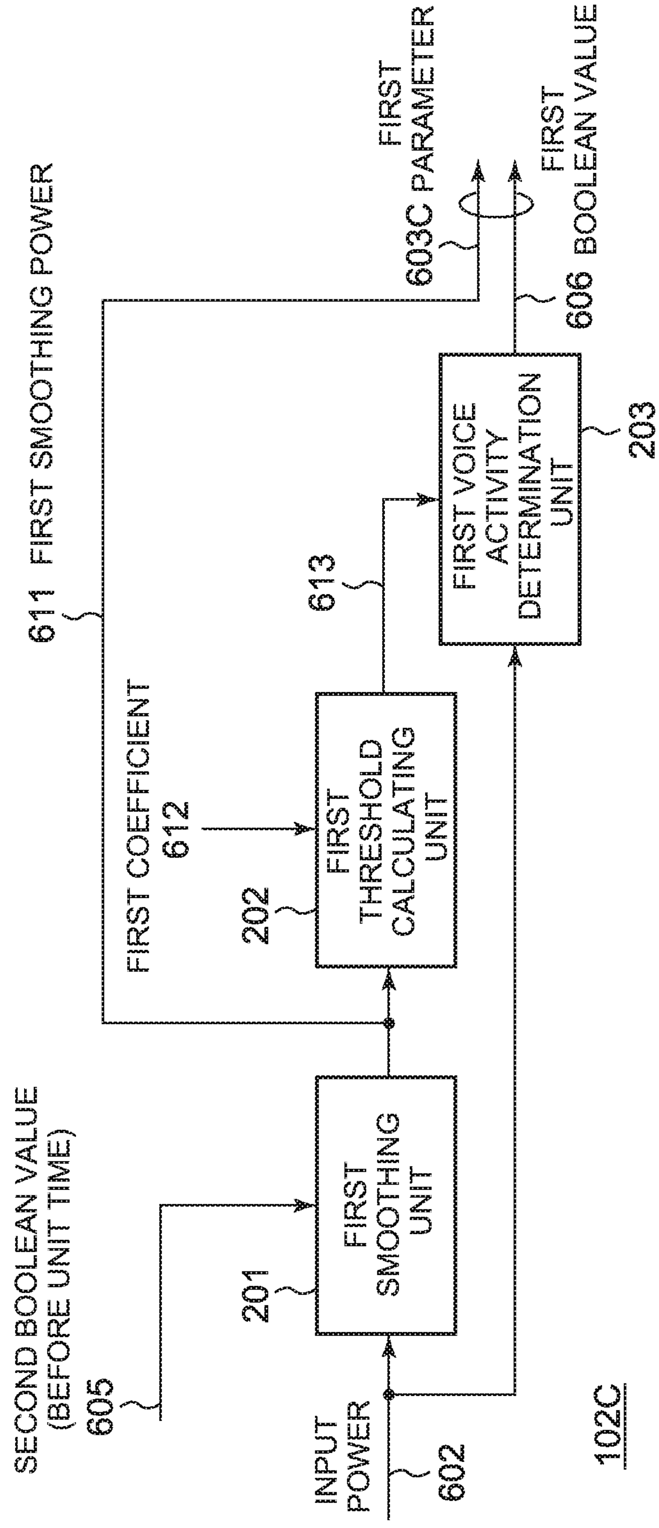
FIG. 21 is a block diagram showing a first voice activity detection unit according to the third embodiment.

FIG. 21 is a block diagram showing the first voice activity detection unit 102C.

As shown FIG. 21, the first voice activity detection unit 102C may include a first smoothing unit 201, a first threshold calculating unit 202, and a first voice activity determination unit 203. The first smoothing unit 201 outputs the first smoothing power 611 to the first threshold calculating unit 202 and the second voice activity detection unit 103C through the time delay unit 104. In other respects, the first smoothing unit 201, the first threshold calculating unit 202, and the first voice activity determination unit 203 are same as the structure in the first embodiment. Therefore the explanation is omitted.

Figure 22:
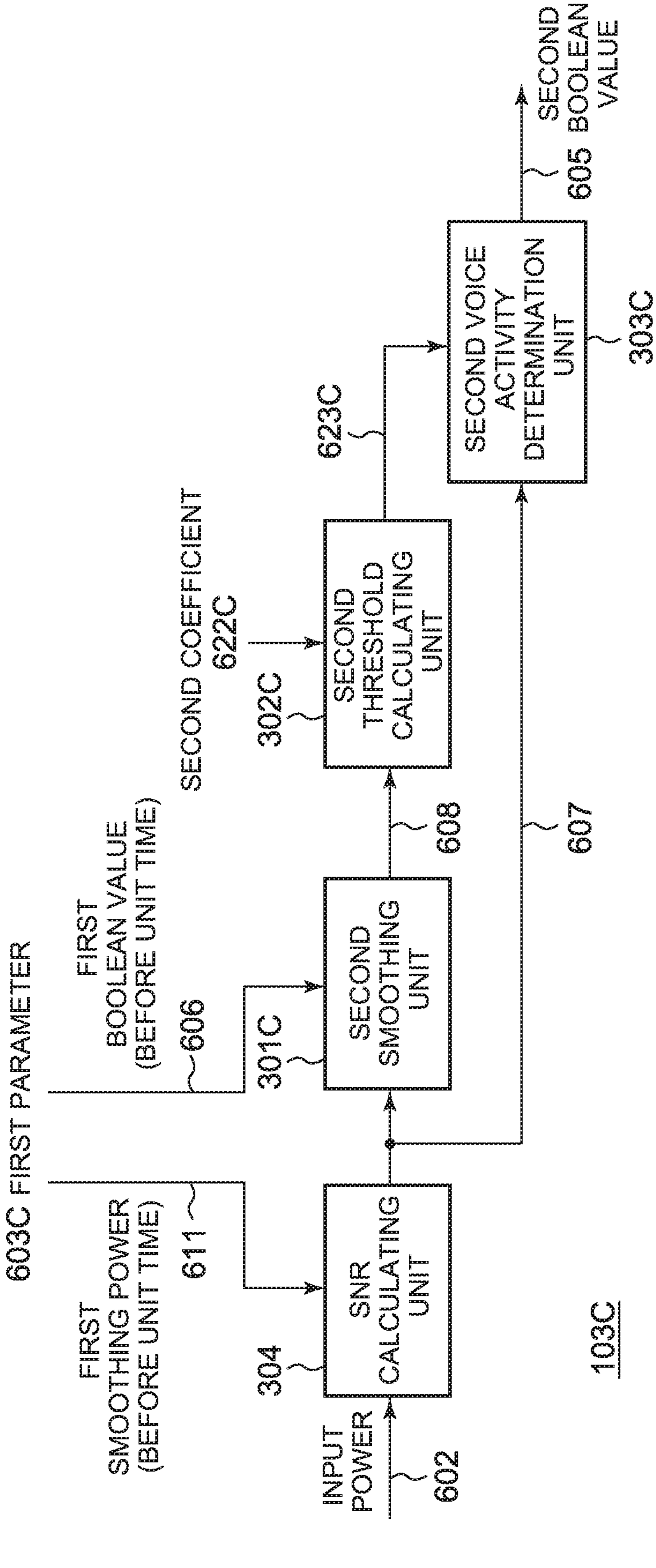
FIG. 22 is a block diagram showing a second voice activity detection unit according to the third embodiment.

FIG. 22 is a block diagram showing the second voice activity detection unit 103C.

As shown FIG. 22, the second voice activity detection unit 103C may include a second smoothing unit 301C, a second threshold calculating unit 302C, a second voice activity determination unit 303C, and a SNR calculating unit 304.

The SNR calculating unit 304 divides the input power 602 in the first smoothing power 611 before unit time as an estimate value of the noise power. The SNR calculating unit 304 divides the input power 602 in the first smoothing power 611 in same unit time as the estimate value of the noise power. Then the SNR calculating unit 304 calculates a SNR estimate value 607. The SNR calculating unit 304 outputs the SNR estimate value 607 to the second smoothing unit 301C and the second voice activity determination unit 303C.

The second smoothing unit 301C smooths the SNR estimate value 607 based on the first Boolean value 606 before unit time. The second smoothing unit 301C may smooths the SNR estimate value 607 based on the first Boolean value 606 in same unit time. And the second smoothing unit 301C calculates a SNR smoothing power 608. Then second smoothing unit outputs the SNR smoothing power 608 to the second threshold calculating unit 302C. If the first Boolean value 606 before unit time is "true" (namely, value indicating speech period), the second smoothing unit 301C smooths the SNR estimate value 607. Then the second smoothing unit 301C updates the SNR smoothing power 608. On the other hand, if the first Boolean value 606 before unit time is "false" (namely, a value indicating noise period), the second smoothing unit 301C does not update the SNR smoothing power 608. Therefore, the SNR smoothing power 608 is a SNR estimate value 607 of speech period. The method of the smoothing is not limited to this. For example, the SNR smoothing power 608 is smoothed by using a time constant filter whose time constant is "0.8".

The second threshold calculating unit 302C multiplies the SNR smoothing power 608 by a second coefficient 622C that is a value more than "0" and no more than "1". Then the second threshold calculating unit 302C calculates a second threshold 623C. The second threshold calculating unit 302 outputs the second threshold 623C to the second voice activity determination unit 303C. The second coefficient 623C may be "0.5".

The second voice activity determination unit 303C compares the second threshold 623C with the SNR estimate value 607. Then the second voice activity determination unit 303C determines whether or not a period corresponding to the unit time is the speech period. Then the second voice activity determination unit 303C outputs the second Boolean value 605. Specifically, if the SNR estimate value 607 is larger than the second threshold 623C, the second voice activity determination unit 303C outputs "true" as the second Boolean value 605. On the other hand, if the SNR estimate value 607 is smaller than the second threshold 623C, the second voice activity determination unit 303C outputs "false" as the second Boolean value 605.

3-2. Processing

Next, processing of the voice activity detection apparatus 100C is explained.

As shown FIG. 20, the input signal 601 is received by the poser calculating unit 101. The input power 602 of the input signal 601 per unit time is calculated by the power calculating unit 101. The input power is received by the first voice activity detection unit 102C and the second voice activity detection unit 103C.

The second Boolean value 605 before the unit time is also received by the first voice activity detection unit 102C. The process of the voice activity detection is executed by the first voice activity detection unit 102 by using the second Boolean value 605 and the input power 602. Then the first parameter 603C is outputted to the second voice activity detection unit 103C through the time delay unit 104 by the first voice activity detection unit 102C.

The first parameter 103C is also received through the time delay unit 104C by the second voice activity detection unit 103C. The process of the voice activity detection is executed by the second voice activity detection unit 103C by using the first parameter 603C and the input power 602. Then the second Boolean value 605 is outputted to the first voice activity detection unit 102C through the time delay unit 104C by the second voice activity detection unit 103C. The second Boolean value 605 is outputted to an external device by the second voice activity detection unit 103C.

Next, processing of the first voice activity detection unit 102C is explained.

As shown FIG. 21, the input power 602 is smoothed based on the second Boolean value 605 before the unit time by the first smoothing unit 201.

Then the first smoothing power 611 is outputted to the first threshold calculating unit 202C. The first smoothing power 611 I multiplied by the first coefficient 612 by the first threshold calculating unit 202. As a result, first threshold 613 is calculated by the first threshold calculating unit 202. Then the first threshold 613 is compared with the input power 602 by the first voice activity determination unit 203.

Then the first parameter 603C including the first Boolean value 606 and the first smoothing power 611 is outputted to the time delay unit 104C.

Next, processing of the second voice activity detection unit 103C is explained.

As shown FIG. 22, the input power 602 and first smoothing power 611 before unit time is received by the SNR calculating unit 304. The SNR estimate value 607 is calculated based on the input power 602 and the first smoothing power 611 by the SNR calculating unit 304.

The SNR estimate value 607 is smoothed based on the first Boolean value 606 before unit time. Specifically, if the first Boolean value 606 before the unit time is "true", the SNR estimate value 607 is smoothed. Then the SNR smoothing power 608 is updated. On the other hand, if the first Boolean value 606 before the unit time is "false", the second smoothing power 621 is not updated. Namely, the SNR smoothing power 608 is maintained. The SNR smoothing power 608 is outputted to the second threshold calculating unit 302C. The SNR smoothing power 621 is multiplied by the second coefficient 622C by the second threshold calculating unit 302C. As a result, the second threshold 623C is calculated by the second threshold calculating unit 302C. Then the second threshold 623C is outputted to the second voice activity determination unit 303C.

Then the second threshold 623C I compared with the SNR estimate value 607 by the second voice activity determination unit 303C. If the SNR estimate value 607 is larger than the second threshold 623C, "true" as the second Boolean value 605 is outputted to the time delay unit 104C and the external apparatus. On the other hand, if the SNR estimate value 607 is smaller than the second threshold 623C, "false" as the second Boolean value 605 I outputted to the time delay unit 104C and the external apparatus.

Either the first voice activity determination unit 203 or the second voice activity determination unit 303C may execute the hangover processing. Both the first voice activity determination unit 203 and the second voice activity determination unit 303C may execute the hangover processing. Neither the first voice activity determination unit 203 nor the second voice activity determination unit 303C may execute the hangover processing. The first hangover time may be 0.1 second. The second hangover time may be 0.2 second.

Figure 26:
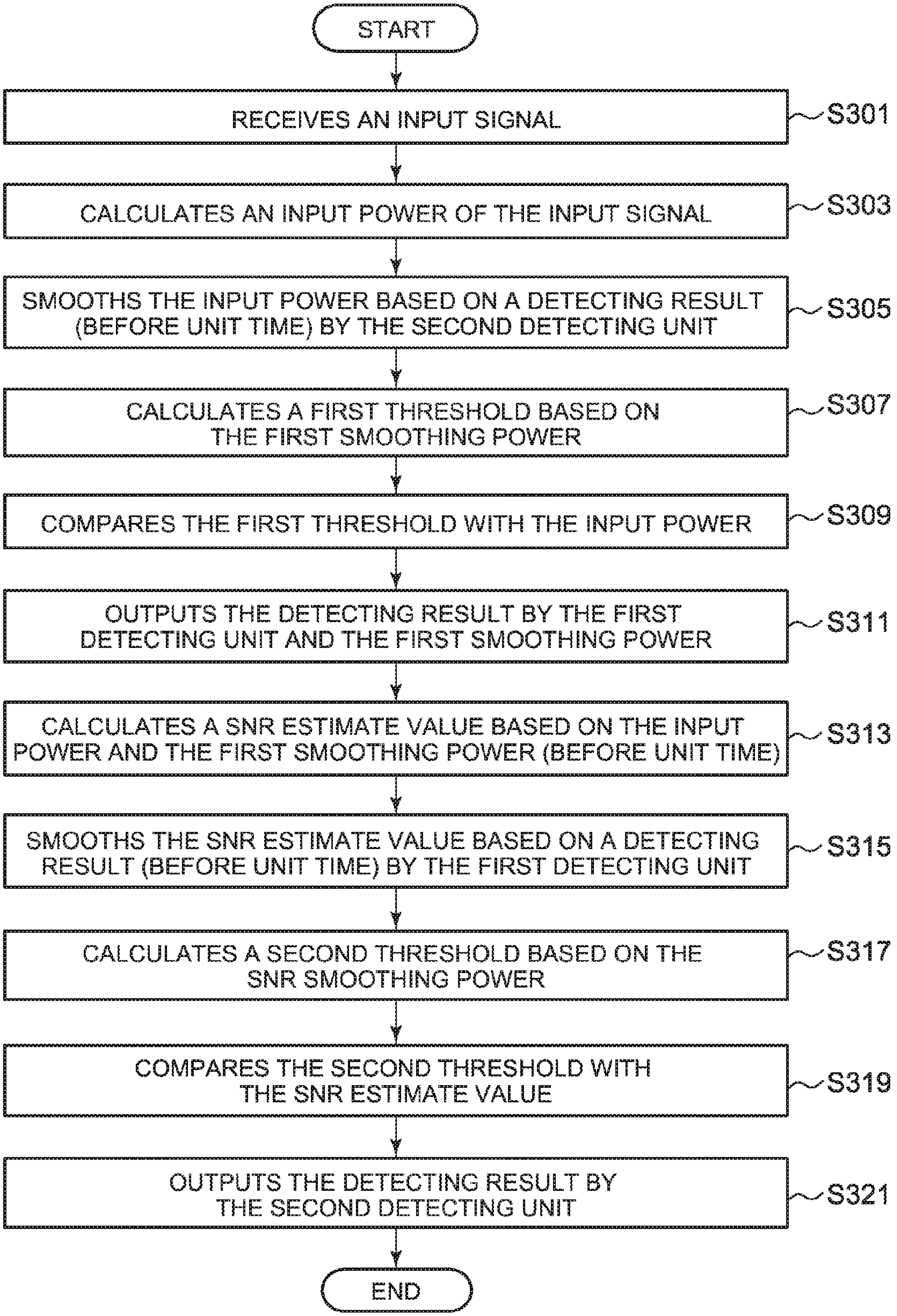
FIG. 26 is a flowchart showing a voice activity detection processing executed by the voice activity detection apparatus according to the third embodiment.

FIG. 26 is a flowchart showing a voice activity detection processing executed by the voice activity detection apparatus 100C.

First, the communication unit 2 receives the input signal 601. Then the communication unit 2 outputs the input signal 601 to the power calculating unit 101. The power calculating unit 101 receives the input signal 601 (step S301). The power calculating unit 101 calculates input power 602 of the input signal 601 (step S303). The first smoothing unit 201 smooths the input power 602 based on the detecting result before unit time by the second detecting unit (the second voice activity determination unit 303C) (step S305). The first threshold calculating unit 202 calculates the first threshold 613 based on the first smoothing power 611 (step S307). The first detecting unit (the first voice activity determination unit 203) compares the first threshold 613 with the input power 602 (step S309). Then the first voice activity determination unit 203 determines whether or not a period corresponding to the unit time is a speech period. Then the first voice activity determination unit 203 outputs the detecting result to the second smoothing unit 301C and the first smoothing unit 201 outputs the first smoothing power 611 to the SNR calculating unit 304 (step S311). The SNR calculating unit 304 calculates a SNR estimate value 607 based on the input power 602 and the first smoothing power 611 before unit time (step S313). The second smoothing unit 301C smooths the SNR estimate value 607 based on the detecting result before unit time by the first detecting unit (the first voice activity determination unit 203) (step S315). The second threshold calculating unit 302C calculates the second threshold 623C based on the SNR smoothing power 608 (step S317). The second detecting unit (the second voice activity determination unit 303C) compares the second threshold 623C with the SNR estimate value 607 (step S319). Then the second voice activity determination unit 303C determines whether or not a period corresponding to the unit time is a speech period. Then the second voice activity determination unit 303C outputs the detecting result to the external apparatus and the first smoothing unit 201 (step S321).

3-3. Effect

According to the third embodiment, the first voice activity detection unit 102C detects a speech period based on the input power 602. And the second voice activity detection unit 103C detects a speech period based on the SNR estimate value 607. Therefore, the precision of voice activity detection improves.

3-4. Modification of the Third Embodiment

The first voice activity detection 102C may detect a speech period based on the SNR estimate value 607. And the second voice activity detection unit 103C may detect a speech period based on the input power 602.

The first voice activity detection 102C and the second voice activity detection unit 103C may detect a speech period based on the SNR estimate value 607.

4. Other Embodiments

In the first embodiment, the first voice activity detection unit 102 updates the first smoothing power 611 when the second Boolean value 605 before the unit time is a value indicating noise period. And the second voice activity detection unit 103 updates the second smoothing power 621 when the first Boolean value 606 in the current unit time is a value indicating speech period.

However, the voice activity detection unit 102 may update the first smoothing power 611 when the second Boolean value 605 before the unit time is a value indicating speech period. And the second voice activity detection unit 103 may update the second smoothing power 621 when the first Boolean value 606 in the current unit time is a value indicating noise period.

The first voice activity detection unit 102 may update the first smoothing power 611 when the second Boolean value 605 before the unit time is a value indicating noise period. And the second voice activity detection unit 103 may update the second smoothing power 621 when the first Boolean value 606 in the current unit time is a value indicating noise period.

The first voice activity detection unit 102 may update the first smoothing power 611 when the second Boolean value 605 before the unit time is a value indicating speech period. And the second voice activity detection unit 103 may update the second smoothing power 621 when the first Boolean value 606 in the current unit time is a value indicating speech period.

In the each embodiment, the first Boolean value 606 may be outputted to the external apparatus. A logical product between the first Boolean value 606 and the second Boolean value 605 may be outputted to the external apparatus. A logical sum between the first Boolean value 606 and the second Boolean value 605 may bet outputted to the external apparatus.

In the each embodiment, the detection result is a Boolean value. However, the detection result may be one of three values (speech period, noise period, unclear period). For example, the detection result may be calculated based on two thresholds. And for example, if the first voice activity detection unit 102 detects a speech period and the second voice activity detection unit 103 detects a speech period, the voice activity detection apparatus 100 outputs the detection result indicating a speech period. If the first voice activity detection unit 102 detects a noise period and the second voice activity detection unit 103 detects a noise period, the voice activity detection apparatus 100 outputs the detection result indicating a noise period. If the first voice activity detection unit 102 detects a speech period and the second voice activity detection unit 103 detects a noise period, the voice activity detection apparatus 100 outputs the detection result indicating an unclear period. If the first voice activity detection unit 102 detects a noise period and the second voice activity detection unit 103 detects a speech period, the voice activity detection apparatus 100 outputs the detection result indicating an unclear period.

In the first embodiment, the first threshold 613 is calculated based on the first smoothing power 611. And the second threshold 623 is calculated based on the second smoothing power 621. However, the first threshold 613 and the second threshold 623 may be calculated based on the input power 602 in predetermined time. Specifically, a minimum value of the input power 602 in the predetermined time (for example, three seconds) determined noise period may be calculated. Then the threshold may be calculated by multiplying the minimum value. A max value of the input power 602 in the predetermined time (for example, three seconds) determined speech period may be calculated. Then the threshold may be calculated by multiplying the max value.

In the each embodiment, the power calculating unit 101 may execute frequency analysis processing to the input signal. The first threshold calculating unit 202 may calculate the first threshold 613 in the input signal 602. The second calculating unit 302 may calculate the second threshold 623 in the input signal 602. The first voice activity determination unit 203 may compare the input power 602 with the first threshold 613 and detects the object sound period in the input signal 601 each frequency band in the input signal 601. The second voice activity determination unit 303 may compare the input power 602 with the second threshold 623 and detects the object sound period in the input signal 601 each frequency band in the input signal 601. The second voice activity determination unit 303 may integrate the detecting results corresponding to the frequency bands and outputs integrated detecting results. For example, the second voice activity determination unit 303 may get the logical product of the detecting results. The second voice activity determination unit 303 may get the logical sum of the detecting results. The second voice activity determination unit 303 may get the majority decision of the detecting results.

In the each embodiment, the object sound period is described as the speech period. However, the present invention is not limited to this. For example, the object sound period may be a motor sound period.

What is claimed is:

1. An object sound period detection apparatus comprising:

a receiving unit that receives an input signal;

a first calculating unit that calculates a first threshold in the input signal every unit time;

a second calculating unit that calculates a second threshold in the input signal every unit time;

a first detecting unit that compares a first feature amount based on the input signal with the first threshold and detects an object sound period in the input signal, and outputs a first detecting result;

a second detecting unit that compares a second feature amount based on the input signal with the second threshold, detects the object sound period in the input signal, and outputs a second detecting result; and a delay unit that receives the second detecting result from the second detecting unit and outputs the second detecting result as the second detecting result before unit time;

wherein the first calculating unit calculates the first threshold based on the second detecting result before unit time, outputted by the delay unit;

wherein the second calculating unit calculates the second threshold based on the first detecting result in same unit time, outputted by the first detecting unit.

2. The object sound period detection apparatus according to claim 1, further comprising:

a first smoothing unit that smooths an input power in the input signal based on the second detecting result before unit time by the second detecting unit;

a second smoothing unit that smooths the input power in the input signal based on the first detecting result in same unit time by the first detecting unit;

wherein the first calculating unit calculates the first threshold based on the input power smoothed by the first smoothing unit;

wherein the second calculating unit calculates the second threshold based on the input power smoothed by the second smoothing unit;

wherein the first feature amount is the input power;

wherein the second feature amount is the input power.

3. The object sound period detection apparatus according to claim 2, wherein if the second detecting result before unit time by the second detecting unit does not indicate the object sound period, the first smoothing unit smooths the input power, if the second detecting result before unit time by the second detecting unit indicates the object sound period, the first smoothing unit does not smooth the input power and sets the input power smoothed before unit time as the input power smoothed in same unit time;

wherein if the first detecting result in same unit time by the first detecting unit indicates the object sound period, the second smoothing unit smooths the input power, if the first detecting result in same unit time by the first detecting unit does not indicate the object sound period, the second smoothing unit does not smooth the input power and sets the input power smoothed before unit time as the input power smoothed in same unit time.

4. The object sound period detection apparatus according to claim 3, wherein the first calculating unit calculates the first threshold based on the input power smoothed by the first smoothing unit and the input power smoothed before unit time by the second smoothing unit;

wherein the second calculating unit calculates the second threshold based on the input power smoothed by the second smoothing unit and the input power smoothed in same unit time by the first smoothing unit.

5. The object sound period detection apparatus according to claim 4, wherein the first calculating unit sets an arithmetic mean or a geometrical mean between the input power smoothed by the first smoothing unit and the input power smoothed before unit time by the second smoothing unit as the first threshold.

6. The object sound period detection apparatus according to claim 5, wherein the second calculating unit sets an arithmetic mean or a geometrical mean between the input power smoothed by the second smoothing unit and the input power smoothed in same time by the first smoothing unit as the second threshold.

7. The object sound period detection apparatus according to claim 1, a first smoothing unit that smooths an input power in the input signal based on the second detecting result before unit time by the second detecting unit;

a SNR calculating unit that calculates a SNR estimation value based on the input power in the input signal and the input power smoothed in same unit time by the first smoothing unit;

a second smoothing unit that smooths the SNR estimation value based on the first detecting result in same unit time by the first detecting unit, calculates a SNR smoothing value;

wherein the first calculating unit calculates the first threshold based on the input power smoothed by the first smoothing unit;

wherein the second calculating unit calculates the second threshold based on the SNR smoothing value;

wherein the first feature amount is the input power in the input signal;

wherein the second feature amount is the SNR estimation value.

8. The object sound period detection apparatus according to claim 1, wherein the receiving unit executes frequency analysis processing to the input signal;

wherein the first calculating unit calculates the first threshold in the input signal each frequency band in the input signal;

wherein the second calculating unit calculates the second threshold in the input signal each frequency band in the input signal;

wherein the first detecting unit compares the first feature amount based on the input signal with the first threshold and detects the object sound period in the input signal each frequency band in the input signal;

wherein the second detecting unit compares the second feature amount based on the input signal with the second threshold and detects the object sound period in the input signal each frequency band in the input signal;

wherein the second detecting unit integrates the second detecting results corresponding to the frequency bands and outputs integrated second detecting results.

9. A noise estimating apparatus comprising:

a receiving unit that receives the input signal;

a first calculating unit that calculates a first threshold in the input signal every unit time;

a second calculating unit that calculates a second threshold in the input signal every unit time;

a first detecting unit that compares an input power in the input signal with the first threshold and detects the object sound period in the input signal;

a second detecting unit that compares an input power in the input signal with the second threshold, detects the object sound period in the input signal, and outputs a detecting result;

a first smoothing unit that smooths the input power based on the detecting result before unit time by the second detecting unit, outputs the input power smoothed by the first smoothing unit as a noise power or a speech power;

a second smoothing unit that smooths the input power based on the detecting result in same unit time by the first detecting unit, outputs the input power smoothed by the second smoothing unit as a noise power or a speech power;

wherein the first calculating unit calculates the first threshold based on the input power smoothed by the first smoothing unit;

wherein the second calculating unit calculates the second threshold based on the input power smoothed by the second smoothing unit;

wherein the first smoothing unit determines whether the first smoothing unit smooths the input power based on the detecting result before unit time by the second detecting unit;

wherein the second smoothing unit determines whether the second smoothing unit smooths the input power based on the detecting result in same unit time by the first detecting unit.

10. The noise estimating apparatus according to claim 9, wherein the first smoothing unit outputs the input power smoothed by the first smoothing unit as the noise power;

wherein the second smoothing unit outputs the input power smoothed by the second smoothing unit as the speech power;

wherein if the detecting result before unit time by the second detecting unit does not indicate the object sound period, the first smoothing unit smooths the input power, if the detecting result before unit time by the second detecting unit indicates the object sound period, the first smoothing unit does not smooth the input power and sets the input power smoothed before unit time as the input power smoothed in same unit time;

wherein if the detecting result in same unit time by the first detecting unit indicates the object sound period, the second smoothing unit smooths the input power, if the detecting result in same unit time by the first detecting unit does not indicate the object sound period, the second smoothing unit does not smooth the input power and sets the input power smoothed before unit time as the input power smoothed in same unit time.

11. The noise estimating apparatus according to claim 9, wherein the first smoothing unit outputs the input power smoothed by the first smoothing unit as the speech power;

wherein the second smoothing unit outputs the input power smoothed by the second smoothing unit as the noise power;

wherein if the detecting result before unit time by the second detecting unit indicates the object sound period, the first smoothing unit smooths the input power, if the detecting result before unit time by the second detecting unit does not indicate the object sound period, the first smoothing unit does not smooth the input power and sets the input power smoothed before unit time as the input power smoothed in same unit time;

wherein if the detecting result in same unit time by the first detecting unit does not indicate the object sound period, the second smoothing unit smooths the input power, if the detecting result in same unit time by the first detecting unit indicates the object sound period, the second smoothing unit does not smooth the input power and sets the input power smoothed before unit time as the input power smoothed in same unit time.

12. A SNR estimation apparatus comprising:

a receiving unit that receives the input signal;

a first calculating unit that calculates a first threshold in the input signal every unit time;

a second calculating unit that calculates a second threshold in the input signal every unit time;

a first detecting unit that compares first feature amount based on the input signal with the first threshold and detects the object sound period in the input signal; and a second detecting unit that compares second feature amount based on the input signal with the second threshold, detects the object sound period in the input signal, and outputs a detecting result;

a first smoothing unit that smooths an input power in the input signal based on the detecting result before unit time by the second detecting unit;

a SNR calculating unit that calculates a SNR estimation value based on the input power in the input signal and the input power smoothed in same unit time by the first smoothing unit;

a second smoothing unit that smooths the SNR estimation value based on the detecting result in same unit time by the first detecting unit, calculates a SNR smoothing value;

wherein the first calculating unit calculates the first threshold based on the input power smoothed by the first smoothing unit;

wherein the second calculating unit calculates the second threshold based on the SNR smoothing value;

wherein the first feature amount is the input power in the input signal;

wherein the second feature amount is the SNR estimation value.

13. An object sound period detection apparatus comprising:

a receiving circuit that receives an input signal;

a first calculating circuit that calculates a first threshold in the input signal every unit time;

a second calculating circuit that calculates a second threshold in the input signal every unit time;

a first detecting circuit that compares a first feature amount based on the input signal with the first threshold and detects an object sound period in the input signal, and outputs a first detecting result;

a second detecting circuit that compares a second feature amount based on the input signal with the second threshold, detects the object sound period in the input signal, and outputs a second detecting result; and a delay circuit that receives the second detecting result from the second detecting circuit and outputs the second detecting result as the second detecting result before unit time;

wherein the first calculating circuit calculates the first threshold based on the second detecting result before unit time, outputted by the delay circuit;

wherein the second calculating circuit calculates the second threshold based on the first detecting result in same unit time, outputted by the first detecting circuit.

* * * * *